United States Patent
Barley et al.

(10) Patent No.: US 9,910,940 B2
(45) Date of Patent: *Mar. 6, 2018

(54) PIPELINE FLOW MODELING METHOD

(71) Applicant: Energy Solutions International, Inc., Houston, TX (US)

(72) Inventors: Jonathan Barley, Darlington (GB); Gregory Morrow, Houston, TX (US)

(73) Assignee: ENERGY SOLUTIONS INTERNATIONAL, INC., Houston, TX (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/694,472

(22) Filed: Apr. 23, 2015

(65) Prior Publication Data

US 2015/0302121 A1 Oct. 22, 2015

Related U.S. Application Data

(63) Continuation of application No. 13/448,970, filed on Apr. 17, 2012, now Pat. No. 9,026,415.

(60) Provisional application No. 61/549,571, filed on Oct. 20, 2011.

(51) Int. Cl.
*G06G 7/48* (2006.01)
*G06F 17/50* (2006.01)
*G06F 17/10* (2006.01)

(52) U.S. Cl.
CPC .......... *G06F 17/5009* (2013.01); *G06F 17/10* (2013.01); *G06F 2217/16* (2013.01); *G06F 2217/34* (2013.01)

(58) Field of Classification Search
CPC .... G06F 17/5009; E21B 43/124; G01F 15/02; F17D 5/02
See application file for complete search history.

(56) References Cited

U.S. PATENT DOCUMENTS

| | | | |
|---|---|---|---|
| 2005/0246112 A1* | 11/2005 | Abhulimen | F17D 5/02 702/51 |
| 2009/0139345 A1* | 6/2009 | Xie | G01F 15/02 73/861.04 |
| 2012/0185220 A1* | 7/2012 | Shippen | G06F 17/5009 703/2 |

(Continued)

*Primary Examiner* — Kandasamy Thangavelu
(74) *Attorney, Agent, or Firm* — Marshall, Gerstein & Borun LLP

(57) ABSTRACT

A method of modeling a segment of a pipeline transporting a product comprising defining within the segment a plurality of discrete cells, each disposed between knots, preparing a system of equations relating the conservations of mass, momentum and energy for each cell along with equations for the liquid phase flow area of cells with tight, slack and minimum area flow modes, providing data relating to the product and the location and elevation of the cells, sensing a plurality of conditions within known cells, solving the system of equations, initiating a re-stepping process by re-assessing the flow modes of each cell and re-setting flow modes for cells with unstable flow modes, and resolving the system of equations using stable flow modes. An embodiment of the method includes excepting one or more cells from the re-stepping portion where a recurrent pattern of flow mode change is detected.

20 Claims, 10 Drawing Sheets

(56) References Cited

U.S. PATENT DOCUMENTS

2012/0211228 A1\* 8/2012 Troshko ............... E21B 43/124
 166/305.1
2013/0103370 A1\* 4/2013 Barley ............... G06F 17/5009
 703/2

\* cited by examiner $$\begin{array}{cccccccccccc}
1 & 0 & 0 & 0 & 0 & 0 \\
0 & 0 & 1 & 0 & 0 & 0 & 0 \\
0 & 0 & 0 & 1 & 0 & 0 & 0 & 0 \\
C^n_{0,1} & C^n_{0,2} & C^n_{0,3} & C^n_{0,4} & C^n_{0,5} & C^n_{0,6} & C^n_{0,7} & C^n_{0,8} & 0 \\
M^n_{0,1} & M^n_{0,2} & M^n_{0,3} & M^n_{0,4} & M^n_{0,5} & M^n_{0,6} & M^n_{0,7} & M^n_{0,8} & 0 & 0 \\
A^n_{0,1} & A^n_{0,2} & A^n_{0,3} & A^n_{0,4} & A^n_{0,5} & A^n_{0,6} & A^n_{0,7} & A^n_{0,8} & 0 & 0 & 0 \\
T^n_{0,1} & T^n_{0,2} & T^n_{0,3} & T^n_{0,4} & T^n_{0,5} & T^n_{0,6} & T^n_{0,7} & T^n_{0,8} & T^n_{0,9} & T^n_{0,10} & T^n_{0,11} & T^n_{0,12} \\
 & 0 & 0 & 0 & C^n_{1,1} & C^n_{1,2} & C^n_{1,3} & C^n_{1,4} & C^n_{1,5} & C^n_{1,6} & C^n_{1,7} & C^n_{1,8} \\
 &  & 0 & 0 & M^n_{1,1} & M^n_{1,2} & M^n_{1,3} & M^n_{1,4} & M^n_{1,5} & M^n_{1,5} & M^n_{1,5} & M^n_{1,5} \\
 &  &  & 0 & A^n_{1,1} & A^n_{1,2} & A^n_{1,3} & A^n_{1,4} & A^n_{1,5} & A^n_{1,5} & A^n_{1,5} & A^n_{1,5} \\
 &  &  &  & T^n_{1,1} & T^n_{1,2} & T^n_{1,3} & T^n_{1,4} & T^n_{1,5} & T^n_{1,5} & T^n_{1,5} & T^n_{1,8} \\
 &  &  &  & 0 & 0 & 0 & C^n_{2,1} & C^n_{2,2} & C^n_{2,3} & C^n_{2,4} \\
 &  &  &  &  & 0 & 0 & M^n_{2,1} & M^n_{2,2} & M^n_{2,3} & M^n_{2,4} \\
 &  &  &  &  &  & 0 & A^n_{2,1} & A^n_{2,2} & A^n_{2,3} & A^n_{2,4} \\
 &  &  &  &  &  &  & T^n_{2,1} & T^n_{2,2} & T^n_{2,3} & T^n_{2,4}
\end{array}$$

$$\begin{matrix}
0 & & & & & & & & & & \\
0 & 0 & & & & & & & & & \\
0 & 0 & 0 & & & & & & & & \\
T^n_{1,9} & T^n_{1,10} & T^n_{1,11} & T^n_{1,12} & & & & & & & \\
C^n_{2,5} & C^n_{2,6} & C^n_{2,7} & C^n_{2,8} & 0 & & & & & & \\
M^n_{2,5} & M^n_{2,6} & M^n_{2,7} & M^n_{2,8} & 0 & 0 & & & & & \\
A^n_{2,5} & A^n_{2,6} & A^n_{2,7} & A^n_{2,8} & 0 & 0 & 0 & & & & \\
T^n_{2,5} & T^n_{2,6} & T^n_{2,7} & T^n_{2,8} & T^n_{2,9} & T^n_{2,10} & T^n_{2,11} & T^n_{2,12} & & & \\
\ddots & \ddots & \ddots & \ddots & \ddots & \ddots & \ddots & \ddots & \ddots & & \\
\ddots & \ddots & \ddots & \ddots & \ddots & \ddots & \ddots & \ddots & \ddots & \ddots & \\
\ddots & \ddots & \ddots & \ddots & \ddots & \ddots & \ddots & \ddots & \ddots & \ddots & \ddots \\
& 0 & 0 & 0 & C^n_{N,1} & C^n_{N,2} & C^n_{N,3} & C^n_{N,4} & C^n_{N,5} & C^n_{N,6} & C^n_{N,7} & C^n_{N,8} \\
& & 0 & 0 & M^n_{N,1} & M^n_{N,2} & M^n_{N,3} & M^n_{N,4} & M^n_{N,5} & M^n_{N,6} & M^n_{N,7} & M^n_{N,8} \\
& & & 0 & A^n_{N,1} & A^n_{N,2} & A^n_{N,3} & A^n_{N,4} & A^n_{N,5} & A^n_{N,6} & A^n_{N,7} & A^n_{N,8} \\
& & & & T^n_{N,1} & T^n_{N,2} & T^n_{N,3} & T^n_{N,4} & T^n_{N,5} & T^n_{N,6} & T^n_{N,7} & T^n_{N,8} \\
& & & & 0 & 0 & 0 & 1 & 0 & 0 & 0
\end{matrix}$$

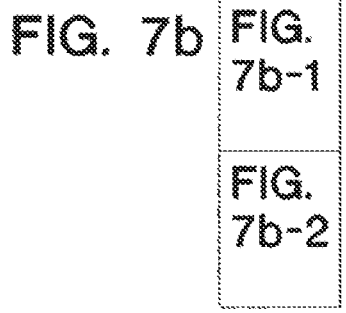

$$y = \begin{pmatrix} \Delta P_{up} \\ \Delta A_{up} \\ \Delta T_{up} \\ C_{0,9}^n \\ M_{0,9}^n \\ A_{0,9}^n \\ T_{0,13}^n \\ C_{1,9}^n \\ M_{1,9}^n \\ A_{1,9}^n \\ T_{1,13}^n \\ C_{2,9}^n \\ M_{2,9}^n \end{pmatrix} \quad x = \begin{pmatrix} \Delta P_0^{n+1/2} \\ \Delta v_0^{n+1/2} \\ \Delta A_0^{n+1/2} \\ \Delta T_0^{n+1/2} \\ \Delta P_1^{n+1/2} \\ \Delta v_1^{n+1/2} \\ \Delta A_1^{n+1/2} \\ \Delta T_1^{n+1/2} \\ \Delta P_2^{n+1/2} \\ \Delta v_2^{n+1/2} \\ \Delta A_2^{n+1/2} \\ \Delta T_2^{n+1/2} \\ \vdots \end{pmatrix}$$

$$\left\{ \begin{array}{c} A_{2,9}^n \\ T_{2,13}^n \\ \vdots \\ \vdots \\ \vdots \\ \vdots \\ C_{N,9}^n \\ M_{N,9}^n \\ A_{N,9}^n \\ T_{N,9}^n \\ \Delta P_{dn} \end{array} \right\} \quad \left\{ \begin{array}{c} \vdots \\ \vdots \\ \Delta P_N^{n+1/2} \\ \Delta v_N^{n+1/2} \\ \Delta A_N^{n+1/2} \\ \Delta T_N^{n+1/2} \\ \Delta P_{N+1}^{n+1/2} \\ \Delta v_{N+1}^{n+1/2} \\ \Delta A_{N+1}^{n+1/2} \\ \Delta T_{N+1}^{n+1/2} \end{array} \right\}$$

FIG. 7b-2

PIPELINE FLOW MODELING METHOD

CROSS-REFERENCE TO RELATED APPLICATIONS

This application claims priority to and depends from U.S. patent application Ser. No. 13/448,970 filed on Apr. 17, 2012, which depends from and claims priority to U.S. Provisional Application Ser. No. 61/549,571 filed Oct. 20, 2011.

BACKGROUND

Field of the Invention

This application relates to mathematical modeling of pipelines to transport hydrocarbons and other products with volatile components.

Background of the Related Art

Pipelines are used to transport liquid hydrocarbon products to ports, processing facilities or refineries. Pumps move the product through the pipeline. Pump stations are deployed at intervals along the pipeline route to compensate for friction head loss and to move product from lower elevations up to and beyond peak elevations. Conditions along the pipeline are monitored using sensors to detect pressure, temperature, flow rate and other measurable properties. Transmitters coupled to the sensors send data to a central processor that uses the data to help drive a model of fluid flow between sensors. One of the key factors in determining the flow is the head, which is related to the pressure, elevation and density of the fluid.

Factors affecting the hydraulic head at any given point along the pipeline include friction head loss and elevation. Friction head loss occurs when product pumped through a pipeline physically interacts with an interior wall of the pipeline and with pipeline features such as expansion loops, bends and valves that may impair flow of product through the pipeline. Friction head loss generally increases with increased flow rates and/or with increased product viscosity, and accumulates with distance along the pipeline downstream of a pump station. Friction head loss per length of pipeline is generally constant for a pipeline of constant diameter and at a steady flow rate. Computer programs may be used to model pipeline flow between sensors by solving the equations of motion which include simulating friction head loss and elevation head.

An elevation profile indicates the elevation of the pipeline at all points along the pipeline route, and indicates the head required to move product through the pipeline. For example, higher elevations downstream of a pump require greater pump discharge head because the product must be moved up to and over peak elevations against the force of gravity.

In purely liquid-phase flow, called "tight" flow, the physics is well understood and is often written as equations of conservation of mass, momentum and energy as well as the physical properties of the fluid being transported, typically referred to as equations of state. Computer modeling of tight flow regions of pipelines is well known in the art.

Products transported by pipelines, such as oil, are often volatile. The vapor pressure of a volatile product generally depends on the chemical composition and on the propensity of lighter components in the product to evaporate to form a vapor phase within the pipeline. For example, oil may comprise a range of hydrocarbons including pentane ($C_5H_{12}$), hexane ($C_6H_{14}$), heptane ($C_7H_{16}$) and octane ($C_8H_{18}$). The lighter (lower molecular weight) components (e.g., pentane and hexane) will, at a pressure below the vapor pressure, evaporate to form a vapor phase within the pipeline. Evaporation of lighter components of volatile products is promoted by low pressures (below the vapor pressure) and high temperatures.

A vapor phase within a pipeline generally resides above the remaining (un-evaporated) liquid which will, in the presence of a vapor phase, flow through the pipeline with a free surface in contact with the vapor phase. This is known as open channel flow (OCF) or, in the pipeline industry, as slack flow. A slack region of a pipeline is a portion of the pipeline where OCF or slack flow occurs. The classical example of OCF is a river flowing through a river bed. In OCF, the liquid phase flows downstream through the pipeline under the influence of gravity and under generally constant pressure. In a river bed, the pressure at the surface of the liquid phase is equal to atmospheric pressure. In a closed pipeline, however, the pressure at the surface of the liquid phase in a slack region is equal to the vapor pressure of the volatile component. The mass of the volatile component (vapor phase) contained within a finite section of the pipeline, being gaseous and at low pressure, is negligible compared to the mass of the liquid component within that same finite section. Slack flow generally begins within a pipeline at points downstream of peak elevations where the head is lower than the vapor pressure (due, for example, to a high elevation profile), and slack flow continues downslope until the pressure within the pipeline again rises above the vapor pressure of the product. It is also possible, although rare, for slack conditions to begin where the downward slope increases, without actually having a local maximum elevation. Sections of the pipeline where slack flow is occurring are referred to as slack regions.

Because the pressure at the surface of the liquid phase is constrained to be equal to vapor pressure in slack regions, the standard "tight line" version of the equations of motion do not adequately describe the behavior of product flowing through slack regions of the pipeline. Hence, conventional pipeline flow models accurately predict pipeline flow in tight flow regions but are insufficient for modeling pipeline flow in slack regions. In tight flow regions, pipeline head decreases with increased elevation and increases with decreased elevation, and the magnitude of change in head for a given change in elevation depends on the density of the product. The pump discharge head needed to move product up to and over a peak elevation depends on the elevation of the peak, the density of the product and the friction head loss from the pump to the peak elevation. The substantially incompressible liquid phase in tight flow regions provides a direct correlation between elevation and head. Slack flow, by contrast, allows product to move through elevation changes without change in pressure and independently of changes occurring in downstream regions of the pipeline.

FIG. 1 is a graph 10 illustrating relationships among the maximum operating pressure (MOP) profile 12 of a pipeline, the actual pipeline head 14 and the elevation profile 16 of the terrain traversed by the pipeline. The pipeline head 14 must remain below the MOP profile 12 to prevent from damaging the pipeline or exceeding a safe operating pressure. To maintain tight line flow, the pipeline head 14 must remain above the elevation profile 16. However, it may not be possible or economical to provide sufficient head to remain above peak elevations indicated at points B and D without unwanted encroachment upon the MOP profile 12. An interval or band formed between the MOP profile 12 and the elevation profile 16 is the targeted operating zone. As long as pipeline head 14 remains within this zone, the product will move through the pipeline without damage to the pipeline.

The hydraulic head profile 14 generally lies along a straight line from point A to point F, but there are features of the hydraulic head profile 14 that reveal the effects of friction and slack flow. For example, line segments A-B, C-D and E-F exhibit a generally common, constant, and negative slope corresponding to the friction head loss per unit distance for a given product flowing at a given product flow rate. A different product and/or a different flow rate will generally exhibit a different slope in these same portions of the pipeline because the amount of friction head loss per unit distance would be different. Deviations from the generally linear decline in head occur at line segments B-C and at D-E as a result of slack flow. Slack flow causes the hydraulic head 14 to track along and equal the elevation profile 16 until tight flow is restored.

Modeling in slack flow regions adds complexity. Pressure becomes decoupled from frictional loss and instead is pegged to the vapor pressure of the product. The model should be adapted to calculate and account for the reduced liquid cross-sectional flow area within such slack flow regions. None of these factors are present in tight flow regions that conform to conventional tight-line models. The liquid phase of the product flows in open channel flow in slack flow regions of the pipeline. Under steady state conditions, the cross-sectional area occupied by the vapor phase of the product in a slack flow region of the pipeline depends solely on the elevation and the slope, but certain changes in the product flow will cause the slack region to expand or contract in cross-section as well as to longitudinally retract or extend along regions of the pipeline.

FIG. 2 is an elevation section view of a descending portion 20 of a pipeline having a diameter 25. The vapor phase 22 meets the liquid phase 24 along an interface 23, and the vapor phase 22 and the liquid phase 24 of the product co-exist with the liquid phase 24 moving in OCF, meaning that the head is equal to the vapor pressure of the product and the descending portion 20 is in a slack flow region of the pipeline. The liquid phase 24 moves along the descending portion 20 of the pipeline in the direction of arrow 26. A discrete mathematical model of the pipeline considers the pipeline as a contiguous set of "computational cells" over which reasonable approximations to the continuum equations describing the flow of product within the pipeline can be written. The primitive variables to be tracked and approximated will be prescribed to the upstream and downstream ends of the cell, and these upstream and downstream cell boundaries will be referred to henceforth as "knots."

A model relies on using a series of determinations of the conditions existing at different times within a common set of computational cells. A model having this structure takes into account that there may be changes over time that occur in one or more of the factors that determine the conditions existing within any given computational cell in a pipeline. The term "time step," as that term is used herein, means the difference in time from a determination of the conditions within a computational cell to a subsequent determination of the conditions within the computational cell.

A computational cell 21 as illustrated in FIG. 2, referred to herein below as a "cell," may lie, for example, within the descending portion 20 as defined between upstream (and upslope) knot 28 and downstream (and downslope) knot 29. It will be understood that knot 28 is also the downstream knot of an upstream cell (not fully shown in FIG. 2) adjacent to cell 21 and knot 29 is the upstream knot of a downstream cell (not fully shown in FIG. 2) adjacent to cell 21.

Pipelines are dynamic, and changes in flow rates, elevation and physical properties of the product moving through the pipeline can cause tight flow regions to change to slack flow regions and slack flow regions to change to tight flow regions. For example, in one instance, rapid transitioning from tight flow to slack flow may occur along gently descending portions of the pipeline at elevations that cause the head to be generally equal to the vapor pressure of the product, just as rapid transitioning from slack flow mode to tight flow mode may occur along gently ascending portions at the same elevations. In another instance, rapid transitioning from tight flow to slack flow may occur along both the ascending and descending portions of a pipeline straddling a peak elevation where a product pump is shut down, thereby causing depressurization of the pipeline both upstream of and downstream of the peak elevation. In yet another instance, rapid transitioning from slack flow to tight flow may occur along portion of a pipeline downstream of a pipeline junction where a product provided from a supplemental pump is suddenly introduced into the pipeline, or rapid transitioning from tight flow to slack flow may occur along this same portion of the pipeline where the supplemental pump is suddenly deactivated or isolated from the pipeline. In another instance, rapid transitioning from tight flow to slack flow may occur along portions of a pipeline upstream of an off take when the flow rate at the off take is increased, or rapid transitioning from slack flow to tight flow may occur along this same portion of the pipeline when the flow rate at an off take is decreased. Under these and other circumstances, multiple cells within the pipeline being modeled can change from being tight to being slack in a single time step. A change from tight to slack, or vice versa, is referred to a change in flow "mode." Conventional tight-line pipeline flow models produce non-physical results (e.g., calculates an impossible negative pressure) under these conditions. Similarly, conventional slack line models can become computationally unstable under these circumstances. The result is compromised surveillance in transitioning regions of the pipeline and a corresponding loss of leak detection capacity, product batch tracking capability, and loss of other important pipeline surveillance and control functions that depend on accurate modeling of the pipeline.

FIG. 3 is a cross-section view of the cell 21 within the descending portion 20 of FIG. 2, again illustrating the dual phase nature of product flowing in a slack flow mode. As in FIG. 2, FIG. 3 illustrates the vapor phase 22 and the liquid phase 24 co-exist in open channel flow, with an interface 23 there between. It should be noted that the cross-sectional flow area of the liquid phase 24 is calculated using the angle 27 formed between a first radius (directed from the center of the pipe diameter 25 to an endpoint of the phase interface 23) and a second, vertical radius (directed from the center of the pipe diameter 25 to the bottom of the descending portion 20 of the pipeline). Using θ for the angle 27 (in radians) formed between a first radius and the second, vertical radius, and using D for the diameter 25 of the interior of the pipeline, the equation for the cross-sectional flow area, A, of the liquid phase 24 in FIG. 3 is:

$$A = \frac{D^2}{4}\left(\theta - \frac{1}{2}\sin 2\theta\right)$$

The liquid flow cross-sectional area is used to model conditions of state at each cell not in tight flow mode. It will be noted that tight flow requires that $\theta=\pi$ and, therefore, the cross-sectional flow area of the liquid phase 24 in tight flow regions is simply the cross-sectional area of the descending portion 20 of the pipeline. It should be understood that these concepts apply equally to ascending or horizontal portions of the pipeline where slack flow may also occur.

Transitions from slack flow to tight flow, and transitions from tight flow to slack flow, occur under circumstances other than sloping (ascending or descending) portions of the pipeline at high elevations. Other circumstances that cause these transitions to occur include liquid product drain-down on both sides of an elevation peak, start-up and/or shut-down of a pump discharging into the pipeline, or the opening or closure of a valve hydraulically connected to the pipeline. FIGS. 4-6 illustrate these circumstances where conventional models yield poor modeling results.

FIG. 4 depicts elevated terrain 37 traversed by a pipeline segment 30 disposed, for example, between an upstream pressure sensor 42 and an upstream temperature sensor 43 on a first side and a downstream pressure sensor 40 and a downstream temperature sensor 41 on a second side, the pipeline segment 30 comprising a peak elevation 35 disposed between an ascending portion 31 and a descending portion 32. A pump 81 is disposed upstream of the ascending portion 31 to move product received from a source 45 up the ascending portion 31 and beyond the peak elevation 35. Upon shutdown of the pump station 81, the hydraulic head throughout the pipeline segment 30 downstream of the pump station 81 will decrease. In some cells where the head falls below the vapor pressure of the product, a transition from tight flow to slack flow will occur in the pipeline segment 30. As the slack region expands, the slack region will migrate upslope in both the ascending portion 31 and the descending portion 32 of the pipeline segment 30 and the liquid will drain downslope in both the ascending portion 31 and the descending portion 32 and in the direction of arrows 33 and 34, respectively. It will be understood that under certain conditions the shut down of pump 81 causes a range of cells within the pipeline segment 30 to transition from tight flow to slack flow.

FIG. 5 illustrates an ascending portion 31 of a pipeline segment in fluid communication with a first pump 82 receiving product from a first source 46 and a second pump 83 receiving product from a second source 47, the second pump 83 being isolatable from the ascending portion 31 of the pipeline by closure of a valve 54. Product flow is along the direction of arrow 38. Upon start-up of the first pump 82 or the second pump 83 (with valve 54 open), or upon opening of valve 54 (with second pump 83 active), a positive pressure surge will move through the ascending portion 31 of the pipeline raising the hydraulic head and, within a range of cells with head at the vapor pressure of the product, transition from slack flow to tight flow mode will occur. Similarly, upon shut-down of the first pump 82 or second pump 83 (with valve 54 open), or upon closure of valve 54 (with second pump 83 active), a negative pressure surge propagates through the ascending portion 31 of the pipeline lowering hydraulic head and, within a range of cells with head at the vapor pressure of the product, transition from tight flow mode to slack flow mode will occur. A pressure sensor 48 and a temperature sensor 49 may be disposed on a first pipeline feed lateral 52 to provide data relating to the conditions of the product within the first pipeline feed lateral 52, and a pressure sensor 50 and a temperature sensor 51 may be disposed on a second pipeline feed lateral 53 to provide data relating to the conditions of the product within the second pipeline feed lateral 53.

FIG. 6 illustrates a descending portion 32 of a pipeline in fluid communication with a first storage tank 90 and a second storage tank 91, the first tank 90 and second tank 91 being isolatable from the descending portion 32 of the pipeline using the first valve 58 and/or second valve 57, respectively. A first tank discharge pipe 92 and a second tank discharge pipe 93 may be provided to drain the first tank 90 and the second tank 91. Product flow is along the direction of arrow 39. A pressure sensor 94 may be provided near the junction of the first tank feed pipe 55 and the second tank feed pipe 56 to provide data relating to the conditions of the product at or near the junction. Upon opening of the first valve 58 or second valve 57, or both, a negative pressure surge propagates up the descending portion 32 and, in a range of cells with head just above the vapor pressure of the product, a transition from tight flow mode to slack flow mode will occur. Upon closure of the first valve 58 or the second valve 57, or both, a positive pressure surge propagates up the descending portion 32 of the pipeline and, in a range of cells with head at the vapor pressure, transition from slack flow to tight flow mode will occur.

It will be understood that these and other changes in pipeline operating modes can cause transitions between tight flow mode and slack flow mode to occur and it is important that these transitions be accurately modeled in order to sustain certain pipeline surveillance and control capabilities. It is feasible to construct a pipeline with a greater number of pumps or robust pumps having greater discharge head and with higher rated valves and pipe materials in order to maintain the product in the liquid phase at all points along the pipeline route. However, such a robust pipeline would be prohibitively expensive to build due to the great cost of the pumps, valves and pipe, and due to the increased construction cost, and it would be prohibitively expensive to operate due to the increased requirement for pump drivers and input power. The product delivered to a port, tanker or refinery by such a robust pipeline system would have the same value as the product shipped through a conventional pipeline that tolerates the formation of slack regions at remote, higher elevations.

It is therefore advantageous to tolerate and manage the formation of a slack region within the pipeline in order to dramatically reduce both the cost of the pipeline system and the cost of operating the pipeline. There is a need for a method of modeling pipeline conditions in: regions affected by changes from tight flow mode to slack flow or from slack flow mode to tight flow; zero flow (shut-in) conditions in slack flow regions; transitions from flowing conditions to shut-in conditions in slack flow regions; transitions from shut-in conditions to flowing conditions in slack flow regions; transitions from forwards flow conditions to backwards flow conditions in slack flow regions; transitions from backwards flow conditions to forwards flow conditions in slack flow regions; and drain down conditions on both sides of an elevation peak.

BRIEF SUMMARY

An embodiment of the present invention provides a method of modeling pipeline flow that uses equations to iteratively determine the conditions of state at each of a plurality of cells of interest within a modeled segment of a pipeline, and that customizes one or more of the equations used to determine the conditions of state depending on the flow mode in each cell for each time step. Embodiments of the method accurately model cell conditions by including the steps of determining the flow mode in a cell of interest (that is, whether the cell is, at a given time step, in tight flow mode, slack flow mode or minimum area flow mode), determining whether the flow mode of the cell of interest is stable, and then selecting, from among a plurality of area equations for each flow mode, the specific equation that provides the best modeling of the conditions of state for that cell of interest for that time step. Using embodiments of the method of modeling pipeline flow, a more stable method of modeling transient pipeline operations under slack line flow is obtained. Embodiments of the method provide, among other benefits, improved and sustained leak detection capability and improved tracking of an interface between successive pipeline product batches moving through a pipeline system.

Specifically, the method of the present invention enables the detection of slack flow mode and the determination of conditions of state in affected cells with more accuracy and stability than conventional methods. In one embodiment, the benefits of modeling the flow within a pipeline segment using the methods disclosed herein enable a pipeline operator to better ascertain the location of an interface between the second batch of product and the first batch of product as the batches move, one trailing the other, through the model segment of the pipeline. As a result, embodiments of the method enable a pipeline operator to adjust pumps, adjust head or to open or close valves in order to better deliver the second batch of product to a targeted delivery location that is different than the targeted delivery location of the first batch of product (for example, a different storage tank or stock tank).

Embodiments of the method of the present invention also provide for better modeling of flow within a modeled segment of a pipeline to enable a pipeline operator to maintain the pipeline head within the modeled segment between the maximum operating pressure (MOP) and the elevation profile by, for example, sustaining accurate modeling during transient pipeline events (such as slack flow, valve opening or closing, or pump start-up or shut down).

Embodiments of the method of the present invention also provide for improved modeling of flow within a modeled segment of a pipeline having slack flow regions for sustained leak detection capability notwithstanding, for example, transitions from slack flow to tight flow and/or from tight flow to slack flow.

Embodiments of the method of the present invention provide for improved modeling of pipeline flow under reverse flow and under shut-down conditions when slack flow occurs under these operating conditions.

In an embodiment of the method, data relating to pipeline conditions, such as pipeline pressure, temperature, flow rate and/or pump discharge pressure, is gathered by sensors and electronically transmitted to a processor for use in initializing boundary equations to facilitate pipeline flow modeling using the method. It should be understood that such a processor may be centralized processor or a distributed as a plurality of processors that may be interconnected and/or networked to function as a central processor.

In an embodiment of the method, an electronically-stored database with relative elevations of a plurality of locations along a model segment of a pipeline, along with the relative distances of those locations from a known benchmark (such as a pump station, sensor location, etc.), is made available to a processor for use in modeling flow within the model segment of the pipeline. Additional data relating to the physical characteristics and connectivity of the pipeline may be included in the database.

In an embodiment of the method, an electronic database with the specific gravity or a value interchangeable with specific gravity (density), vapor pressure and/or viscosity data for one or more products comprising volatile components to be transported through a model segment of a pipeline is made available to a processor for use in modeling flow of the one or more products within the model segment of the pipeline. In one embodiment, this database may comprise a range of specific gravity, density, vapor pressure and/or viscosity data for a range of temperatures and/or pressures.

It should be understood that the electronically-stored databases described above for measured pipeline conditions, relative elevation and distance of locations along a model segment of a pipeline, and/or physical properties of one or more products to be transported through the model segment of the pipeline, may all be used to facilitate calculations of conditions in cells of the model segment using a process as described herein below.

In an embodiment of the method, the flow within a model segment of a pipeline is compared to and/or reconciled with data gathered by sensors and data reflecting actual conditions within the model segment, and the differences between a modeled condition at a cell of interest and an actual condition at the cell of interest may be compared to a predetermined alarm setting or range (e.g., permitted margin) to enable a pipeline operator or an automated program to alert personnel when an actual reading materially varies from a modeled value for a particular condition, and/or to either prompt personnel to take remedial action to address the condition or to automatically take remedial action to address the condition.

For example, but not by way of limitation, if an actual pressure for a location along the modeled segment of a pipeline falls substantially below the pressure predicted for that location using an embodiment of the method, an alert may be published to an operator at a control room, and the operator may interpret the deviation from the modeled head as indicating a pipeline leak. As a result, the operator may take appropriate remedial action such as, for example, sending personnel to investigate the problem, running diagnostics or shutting down the pipeline. Embodiments of the method of the present invention provide the capacity to accurately model flow in a model segment of the pipeline during slack line conditions, and provides a valuable tool that enables a pipeline operator to prevent or limit an environmental release that might otherwise remain undetected.

Using data from monitored sensors, product data such as viscosity, vapor pressure and specific gravity relating to one or more products, and data relating to the elevation and distance of locations along the pipeline, embodiments of the method of the present invention enable the accurate modeling of the flow of one or more products flowing within a modeled segment using a processor to perform numerous iterative calculations to determine the conditions existing in a plurality of cells within the model segment of the pipeline. A model segment of a pipeline is divided into numerous discrete cells to facilitate a sequence of computations at each of a sequence of time steps. The equations of motion are approximated within each cell by applying a standard implicit numerical scheme (the so-called "box scheme") to the specific equations under consideration. At a given time step the numerical scheme is applied within all of the cells within a model segment building up a matrix of linked equations whose solution leads to the state of the cells at the end of the time step. Since conditions within the pipeline change with time, the modeling process, once completed for the time step, begins anew using updated data for the subsequent time step.

In one embodiment, the pipeline is divided up into a number of model segments. Each model segment is a linear unbranched part of the pipeline that is bounded by measurements indicating the condition or state at that boundary. The measurements can include pressure, temperature or velocity (e.g., closed valves indicating a zero flow condition). A model segment is divided into a number of contiguous computational cells each of which is bounded by a knot at each end of the cell, each knot corresponding to a known elevation and a known location (distance) along the pipeline. Each knot therefore lies between two cells, excepting the first and the last knot of the model segment.

Sensors may be disposed at strategic points along the pipeline to provide measurements of actual conditions such as, for example, temperature, flow rate and/or pressure, at known locations and elevations. The data provided by the sensors may be used to provide boundary conditions for the model.

Computer systems, such as, for example, high speed processors, may be used to obtain, record, store and retrieve data relating to the operation of the pipeline, physical properties of products and/or the physical parameters relating to the pipeline at various locations along the pipeline route, and to mathematically solve and re-solve equations used to model conditions within the cells of the modeled segment. The examples given herein are not to be taken as limiting of the uses of the present invention, which is limited only by the claims.

BRIEF DESCRIPTION OF THE SEVERAL VIEWS OF THE DRAWINGS

FIG. 7a is an example of a left-hand side matrix written using the computational cell equations for determining the hydraulic state of the product within cells of a modeled segment and which is to be inverted to obtain the state variables for the entire model segment.

FIG. 7b are examples of a right hand side (single column) vector and a (single column) vector of unknown (knot) state variable changes.

FIG. 8 is a high level flow chart illustrating the steps of one embodiment of the method of the present invention for advancing the hydraulic state by one time step, and.

DETAILED DESCRIPTION

Figure 1:
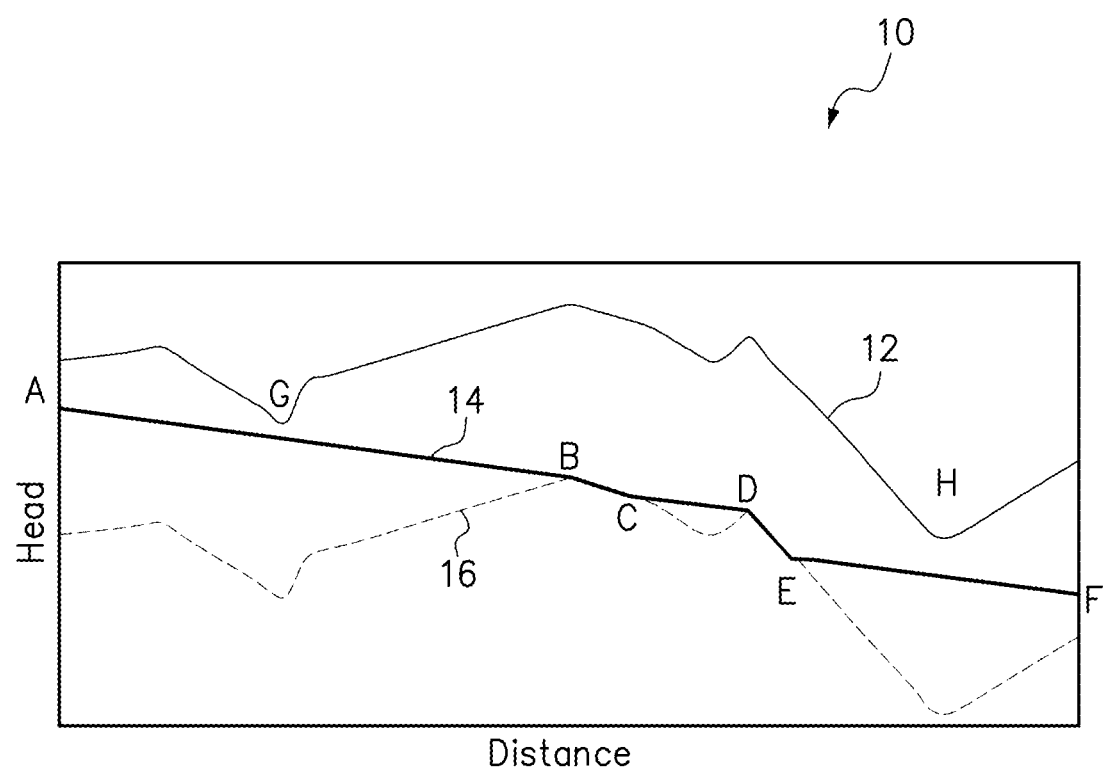
FIG. 1 is a graph illustrating the relationship between elevation, hydraulic gradient within a pipeline and maximum operating head for a portion of a pipeline traversing elevated terrain.
Figure 2:
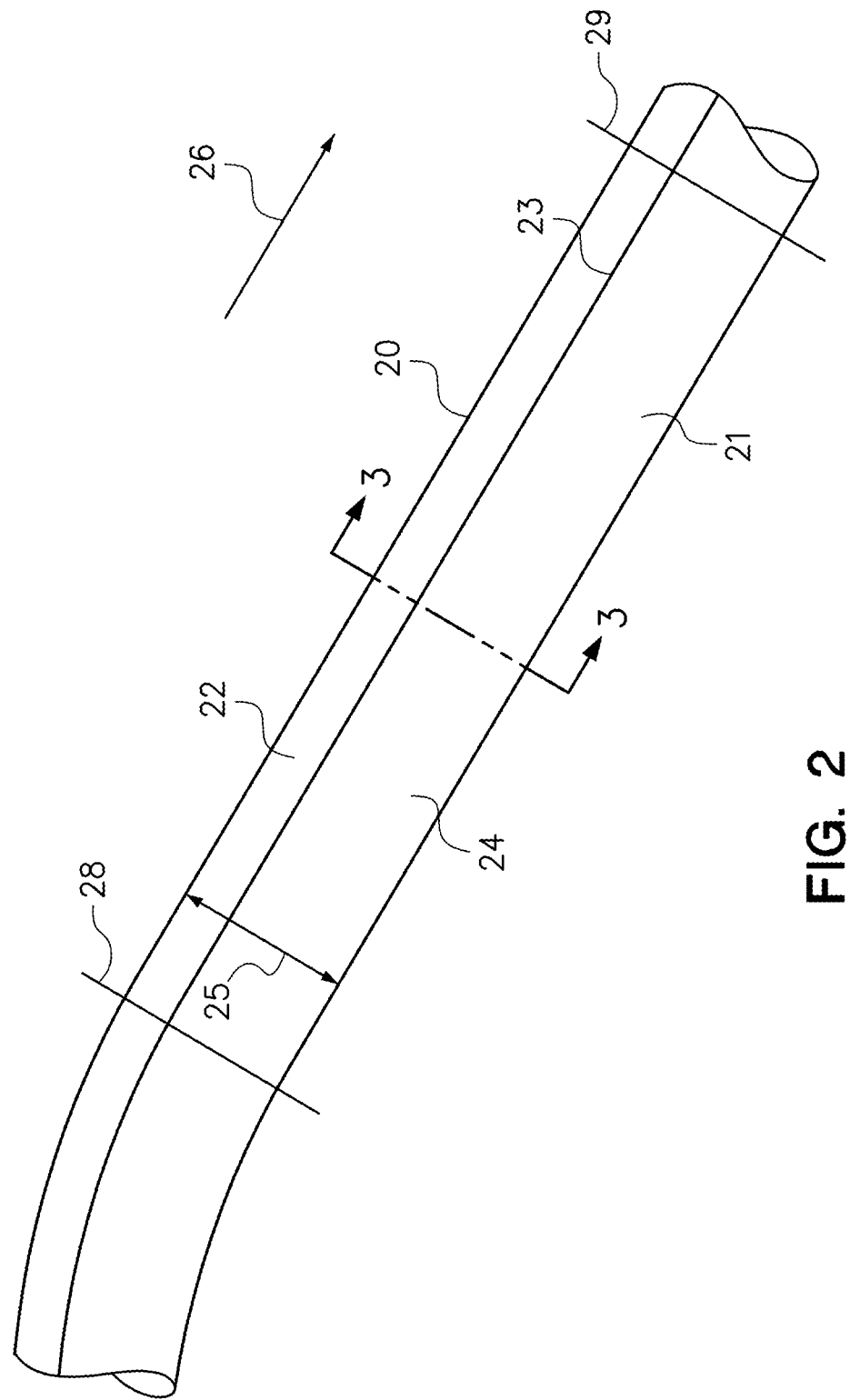
FIG. 2 is an elevation section view of a descending portion of a pipeline in a slack flow region with open channel flow.

One embodiment of the method of the present invention provides a computer programmable method of modeling the flow, in a model segment of a pipeline, of a product having volatile components that provides stable computational hydraulic modeling of transient pipeline conditions including tight flow conditions; slack flow conditions; transitions between tight and slack flow conditions; shut-in (zero flow) conditions in slack regions; transitions to and from shut-in conditions in slack flow regions; transitions from forwards to backwards (reversed) flow in slack regions; transitions from backwards flow to forwards flow in slack regions; and drain down on both sides of a peak elevation traversed by the model segment. Embodiments of the method overcome the shortcomings of conventional models that fail to accurately model flow involving these and other transient conditions.

Embodiments of the method use three fixed state equations, relating the conservation of momentum, conservation of mass and conservation of energy, along with a fourth equation (hereinafter referred to as the "fourth equation") relating to cross-sectional flow area of the liquid phase of the product flowing through the model segment. These four equations are used, along with boundary equations to be discussed below, to determine the conditions in a cell of interest at each time step:

Conservation of Mass $$A\frac{\partial \rho}{\partial P}(P_t + vP_x) + A\frac{\partial \rho}{\partial T}(T_t + vT_x) + \rho(A_t + vA_x) + A\rho v_x = 0$$

Conservation of Momentum $$v_t + vv_x + \frac{1}{\rho}P_x + gh_x + \frac{fv|v|}{2D_0} = 0$$

Conservation of Energy $$\rho C_v(T_t + vT_x) = -T\frac{\partial P}{\partial T}\bigg|_\rho \frac{1}{A}(Av)_x + \rho\frac{fv^2|v|}{2D_0} - \frac{4U_w(T - T_g)}{D_0}$$

Tight Flow Flowing Area $$A = A_0\left(1 + \frac{1}{A_0}\frac{\partial A}{\partial P}(P - P_0) + \frac{1}{A_0}\frac{\partial A}{\partial T}(T - T_0)\right)$$

Slack Flow Flowing Area
$P = P_{vap}$ Slack flow minimum area equation
$A = A_{min}$ The symbols, abbreviations and variables used in these equations are explained below:

| A | $m^2$ | Pipe cross Section Area (csa) |
|---|---|---|
| $\rho$ | $kg/m^3$ | In-situ fluid density |

-continued

| | | |
|---|---|---|
| v | m/s | fluid velocity (Eulerian) |
| x | m | Distance along pipe |
| t | s | time |
| $(o)_x$ | | Partial Derivative with respect to distance |
| $(o)_t$ | | Partial Derivative with respect to time |
| P | Paa | Fluid Pressure |
| T | K | Fluid Temperature |
| g | m/s$^2$ | Acceleration due to gravity |
| h | m | Pipe elevation |
| f | | Friction factor |
| $D_0$ | m | Pipe Inside Diameter (at reference press. and temp.) |
| $P_0$ | Paa | Reference Pressure |
| $T_0$ | K | Reference Temperature |
| $\frac{\partial \rho}{\partial P}$ | kg/m$^3$/Paa | Rate of change of density with respect to pressure |
| $\frac{\partial \rho}{\partial T}$ | kg/m$^3$/K | Raw of change of density with respect to temperature |
| $\left(\frac{\partial \rho}{\partial T}\right)\rho$ | Paa/K | Rate of change of pressure with respect to temperature at constant density |
| $\frac{\partial A}{\partial P}$ | m$^2$/Paa | Rate of change of pipe cross section area with respect to pressure |
| $\frac{\partial A}{\partial T}$ | m$^2$/K | Rate of change of pipe cross section area with respect to temperature |
| $U_w$ | W/m$^2$/K | Overall heat transfer coefficient |
| $T_g$ | K | Ground Temperature |
| $P_{vap}$ | Paa | Fluid Vapor Pressure |
| $A_{min}$ | m$^2$ | The minimum flowing area |
| $C_v$ | | Fluid specific heat capacity |

Embodiments of the method include steps for evaluating the flow mode of a cell of interest and for determining the flow mode in the cell of interest to be either stable or unstable. Where the flow mode of a cell is determined to be stable, embodiments of the method may be used to determine conditions in the cell of interest using the three fixed equations and a fourth equation relating the liquid phase cross-sectional flow area that specifically corresponds to the (stable) flow mode. As will be discussed in more detail below, the flow mode may be determined to be tight, slack or minimum area. Where the flow mode of a cell is found to be unstable, embodiments of the method re-evaluate the flow mode in the cell of interest until the flow mode is determined to be stable, and then the method determines conditions in the cell using the three fixed equations and a fourth area equation corresponding to the (stable) flow mode.

Figure 4:
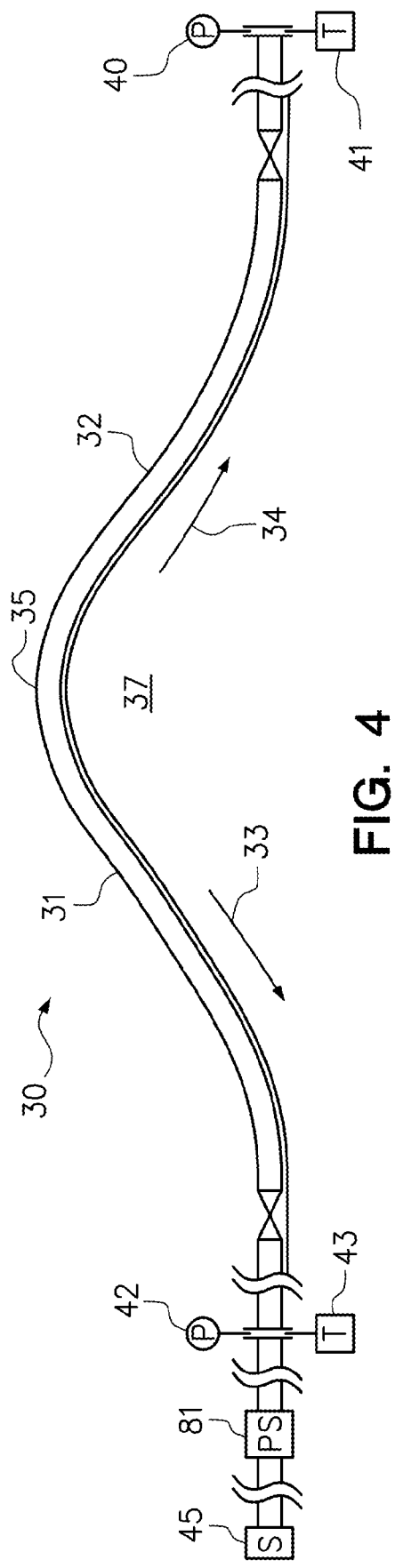
FIG. 4 illustrates the configuration of a section of pipeline which may, under some conditions, cause liquid phase of a product to drain down on both sides of a local elevation peak.
Figure 6:
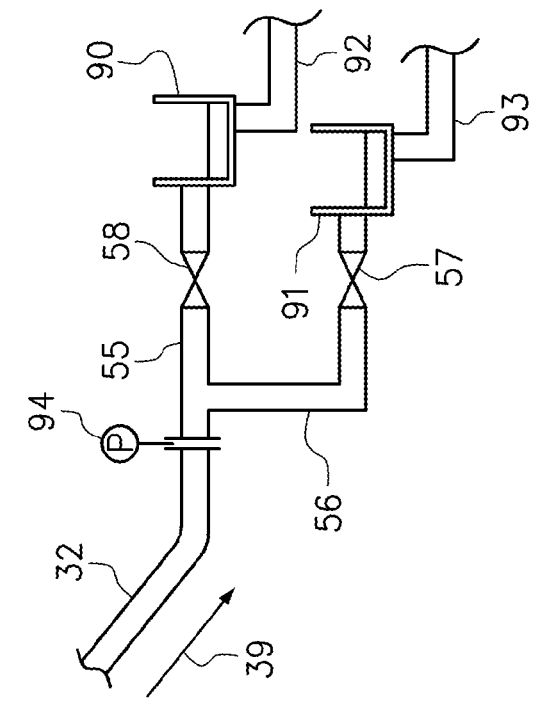
FIG. 6 illustrates a pipeline drain junction disposed downstream of a model segment comprising a peak elevation.
Figure 5:
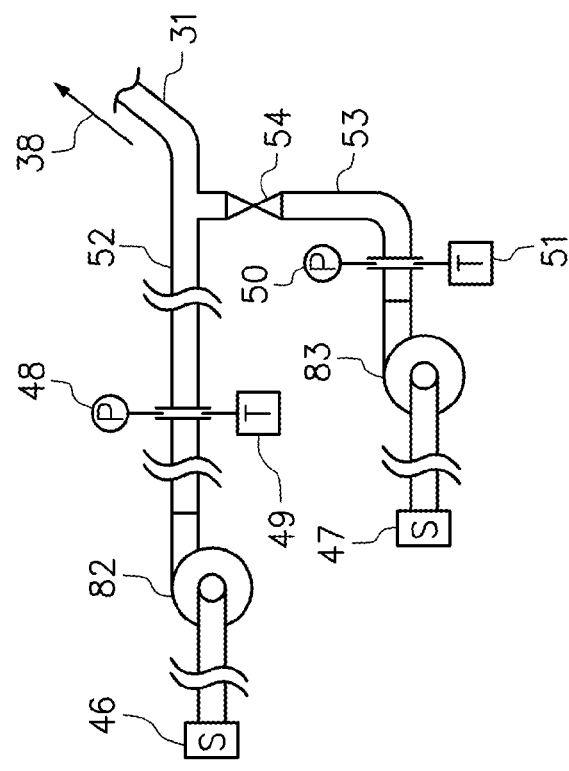
FIG. 5 illustrates a pipeline feed junction disposed upstream of a model segment comprising a peak elevation.

One of the fundamental concepts in embodiments of the method is the description of orientation. The abstraction of the physical pipeline leaves the orientation of the model pipeline to the discretion of the modeler. The modeler is left to assign the model pipeline a "head" and a "tail" to enable connectivity reference. The normal direction of flow is used to allow the terms "upstream" and "downstream" when referencing one point on the model pipeline relative to another. However, when flow can be in either direction within a pipe then these terms and this usage of these terms is no longer adequate to describe the onset and growth of slack flow regions. For example in FIG. 4, the normal direction of flow within the pipeline and within the ascending portion 31 of the pipeline is from left to right, but under drain down conditions (for example, upon shutdown of pumps) the direction of flow within the ascending portion 31 of the pipeline to the left of the elevation peak 35 is actually from right to left and in the direction of arrow 33, and the direction of flow within the descending portion 32 of the pipeline to the right of the elevation peak 35 is from right to left and in the direction of arrow 34. The terms "upstream" and "downstream" are therefore inadequate for embodiments of the method of the present invention to describe how the slack region develops. Clear and adequate alternative terms are "upslope" and "downslope." "Upslope" is a reference to a cell in which the right end has a higher elevation. "Downslope" is a reference to a cell in which the right end has an equal or lower elevation. Using this terminology we can state that, in embodiments of the method of the present invention, as slack flow develops the slack region expands downslope; the duality of direction encountered in drain down on both sides of an elevation local maxima is no longer an issue as the phenomena is now described accurately and succinctly.

In one embodiment of the method of the present invention, a grid is imposed on a model segment of a pipeline to divide the model segment into a plurality of cells, each cell defined between an "upstream" knot and a "downstream" knot. In this sense "upstream" and "downstream" refer to the normal orientation of a one dimensional numerical grid (left to right). It is not necessary that the cells be of equal size. Except for the first and last knots in a model segment, each knot borders two adjacent cells. The primitive variables of interest are pressure (P), temperature (T), velocity (v) and liquid phase cross-sectional area (A). These variables are defined at the knots (that define the cells) within the model segment. An embodiment of the method calculates the values for these variables at each knot at each time step. The state within each computational cell is defined by the values of the variables at the knots at each end of the computational cell. The relationships among the four primitive variables are defined by the principles of the conservation of mass, the conservation of momentum and the conservation of energy, as well as the functional relationship between density, pressure and temperature and between friction factor, density, viscosity, velocity and diameter. Since there are four primitive variables, there must be four equations in order for the solution to be determined. The three conservation laws are invariant, but the selection of the fourth equation, the liquid phase flow area equation, depends on the flow mode of the cell. In cells that are tight, the fourth equation defines the cross sectional area of the pipe (tight flow area equation). In cells that are slack, the fourth equation is independent of the cross-sectional pipe area (slack flow area equation). Instead, the liquid phase flow area is set at whatever it needs to be to maintain the pressure in the slack region at the vapor pressure of the product. In cells that are deemed to be slack but using the minimum flowing area constraint (which may be, for example, 2% of the total available flow area of the pipeline at that cell), the area equation is simply the minimum flowing area constraint.

In one embodiment of the method of the present invention, the continuum equations described above are approximated within each computational cell using the implicit finite difference box scheme. This matrix of linearized discrete equations may be constructed by considering the cells in the order specified by the modeled segment. If the modeled segment is divided into N discrete cells, there are necessarily N+1 knots. With four equations (mass, energy, momentum and area) for each knot within the modeled segment, there are a total of 4×(N+1) equations for the modeled segment. Since there are four primitive variables for each knot, the matrix is square.

The three fixed equations can be expressed using the following nomenclature:

k is the computational cell reference number. The knot at the upslope end of the cell is referenced as knot k and the knot at the downslope end of the cell is referenced as knot k+1;
n is the time step count;
$C_{k,j}^n$=mass (continuity) equation coefficient j in cell k at time n;
$M_{k,j}^n$=momentum equation coefficient j in cell k at time n;
$T_{k,j}^n$=energy equation coefficient j in cell k at time n;
$A_{k,j}^n$=area equation coefficient j in cell k at time n;
$\Delta_t P_k^{n+1/2}$=change in pressure at a knot k over the time step;
$\Delta_t T_k^{n+1/2}$=change in temperature at a knot k over the time step;
$\Delta_t v_k^{n+1/2}$=change in velocity at a knot k over the time step;
$\Delta_t A_k^{n+1/2}$=change in flowing area at a knot k over the time step;
$C_{k,9}^n$=right hand side of the equation for mass conservation for the kth cell;
$M_{k,9}^n$=right hand side of the equation for momentum conservation for the kth cell;
$T_{k,13}^n$=right hand side of the equation for energy conservation for the kth cell;
$A_{k,9}^n$=right hand side of the area equation for the kth cell;
N=number of cells within a model segment; and
N+1=number of knots within a model segment having NBINT cells.

Putting the equation for the conservation of mass into these terms, we obtain a first fixed equation:

$$C_{k,1}^n \Delta_t P_k^{n+1/2} + C_{k,2}^n \Delta_t T_k^{n+1/2} + C_{k,3}^n \Delta_t v_k^{n+1/2} + \\ C_{k,4}^n \Delta_t A_k^{n+1/2} + C_{k,5}^n \Delta_t P_{k+1}^{n+1/2} + C_{k,6}^n \Delta_t T_{k+1}^{n+1/2} + C_{k,7}^n \Delta_t v_{k+1}^{n+1/2} + C_{k,8}^n \Delta_t A_{k+1}^{n+1/2} = \\ C_{k,9}^n$$

Putting the equation for the conservation of momentum into these terms, we obtain a second fixed equation:

$$M_{k,1}^n \Delta_t P_k^{n+1/2} + M_{k,2}^n \Delta_t T_k^{n+1/2} + M_{k,3}^n \Delta_t v_k^{n+1/2} + \\ M_{k,4}^n \Delta_t A_k^{n+1/2} + M_{k,5}^n \Delta_t P_{k+1}^{n+1/2} + M_{k,6}^n \Delta_t T_{k+1}^{n+1/2} + M_{k,7}^n \Delta_t v_{k+1}^{n+1/2} + M_{k,8}^n \Delta_t A_{k+1}^{n+1/2} = \\ M_{k,9}^n$$

Putting the equation for the conservation of energy into these terms, we obtain a third fixed equation:

$$T_{k,1}^n \Delta_t P_k^{n+1/2} + T_{k,2}^n \Delta_t T_k^{n+1/2} + T_{k,3}^n \Delta_t v_k^{n+1/2} + \\ T_{k,4}^n \Delta_t A_k^{n+1/2} + T_{k,5}^n \Delta_t P_{k+1}^{n+1/2} + T_{k,6}^n \Delta_t T_{k+1}^{n+1/2} + \\ T_{k,7}^n \Delta_t v_{k+1}^{n+1/2} + T_{k,8}^n \Delta_t A_{k+1}^{n+1/2} + T_{k,9}^n \Delta_t \\ P_{k+2}^{n+1/2} + T_{k,10}^n \Delta_t T_{k+2}^{n+1/2} + T_{k,11}^n \Delta_t v_{k+2}^{n+1/2} + \\ T_{k,12}^n \Delta_t A_{k+2}^{n+1/2} = T_{k,13}^n$$

For upslope to downslope flow the coefficients, $T_{k,9}^n = T_{k,10}^n = T_{k,11}^n = T_{k,12}^n = 0$. For downslope to upslope flow the coefficients, $T_{k,1}^n = T_{k,2}^n = T_{k,3}^n = T_{k,4}^n = 0$.

These three fixed equations may be used to approximate the primitive variables within a given cell. With four variables, a fourth equation is needed to enable the determination of the four variables. In embodiments of the method of the present invention, the choice of the fourth equation depends on the flow mode within a computational cell. However, the approximation can be written in the form:

$$A_{k,1}^n \Delta_t P_k^{n+1/2} + A_{k,2}^n \Delta_t T_k^{n+1/2} + A_{k,3}^n \Delta_t v_k^{n+1/2} + \\ A_{k,4}^n \Delta_t A_k^{n+1/2} + A_{k,5}^n \Delta_t P_{k+1}^{n+1/2} + A_{k,6}^n \Delta_t T_{k+1}^{n+1/2} + A_{k,7}^n \Delta_t v_{k+1}^{n+1/2} + A_{k,8}^n \Delta_t A_{k+1}^{n+1/2} = \\ A_{k,9}^n$$

The four equations described in paragraphs [0062], [0063], [0064] and [0065] are local linearized approximations of the continuum equations described in paragraphs [0051], [0052], [0053], [0054] and [0055] and are referred to as the computational cell equations.

In embodiments of the method of the present invention, precisely which fourth equation is needed for a computational cell depends on the flow mode. The direction of application of the fourth equation depends on the slope of the cell. If the cell slopes downwardly (in elevation), moving from right to left, then the right side knot is the upslope knot and the left side knot is the downslope knot. Otherwise, the left knot is the upslope knot and the right knot is the downslope knot. A level cell, i.e. one where the right knot and the left knot are at the same elevation, is treated the same as a cell that slopes downwardly. It will be understood that the upslope or downslope designations will be made according to elevation data for points along the modeled segment of the pipeline.

The above four computational cell equations are written once each for each cell, resulting in 4×N equations. The remaining four equations required to make a square matrix are provided by known conditions which, in one embodiment, are called boundary conditions.

A known condition is a condition of the product within the pipeline and within a cell of the pipeline adjacent to a sensor. For example, a sensor, such as, for example, a pressure sensor, may be disposed adjacent the first cell of the modeled segment to detect a condition, such as, for example, the pressure, of the product within the first cell. If a first sensor is disposed adjacent the first cell of the modeled segment and a second sensor is disposed adjacent the last cell of the modeled segment, the conditions sensed by the first sensor in the first cell and the second sensor in the last cell will be referred to as boundary conditions. There are four boundary conditions that provide the remaining equations required to find the solution of the matrix equations in accordance with embodiments of the present invention. Typically, and in accordance with the example given above, embodiments will include pressure-pressure boundary conditions where the pressure at both ends of the modeled segment of the pipeline is prescribed. Embodiments of the method may also require one temperature boundary condition and one area boundary condition: the temperature boundary condition being set at the inflowing end of the pipeline and the area boundary condition being (arbitrarily) set at the upstream end of the pipe. In one embodiment, such as in an embodiment with a valve closure at the end of the pipeline, a velocity boundary condition (zero velocity) may be substituted for a pressure boundary condition.

In the embodiment of the method of the present invention given above, boundary conditions are applied at the first and last knot in the model segment. Either two or three of the boundary conditions are applied at the first knot and the remaining boundary conditions are applied at the last knot. In a preferred embodiment, two of the boundary conditions are supplied by pressure measurements: The measured pressure at the first knot, $P_1$, and the measured pressure at the last knot, $P_{N+1}$. If either of these measurements is not available, a zero flow condition may be substituted (i.e., either $v_1 = 0$ or $v_{N+1} = 0$, or both $v_1 = 0$ and $v_{N+1} = 0$). A third required boundary condition is an external temperature, either a temperature measurement of fluid flowing into the model segment at the first knot, $T_1$, or at the last knot, $T_{N+1}$ depending on the flow direction. A fourth boundary condition may be obtained by setting the area of the cross-section of the liquid phase flow at the first knot, $A_1$, to the full pipe cross-section so that $A_1 = A(P_1, T_1)$. It will be understood that, as a matter of mathematical necessity, the 4(N+1) computational cell equations, which includes the 4 boundary condition equations, enable the solution of the matrix equation, which allows the updating of the primitive variables from one time step to the next.

For the upstream pressure boundary condition, we have the change in pressure prescribed at the upstream end of the pipe, i.e., $P_{up}=P_{up}(t)$ therefore $\Delta P_{up}=P_{up}((n+1)\Delta t)-P_{up}(n\Delta t)$ The equation is $PU_{1,1}{}^n\Delta_t P_1{}^{n+1/2}+PU_{1,2}{}^n\Delta_t T_1{}^{n+1/2}+PU_{1,3}{}^n\Delta_t v_1{}^{n+1/2}+PU_{1,4}{}^n\Delta_t A_1{}^{n+1/2}=\Delta P_{up}$ where
$PU_{1,1}{}^n=1$ and
$PU_{1,2}{}^n=PU_{1,3}{}^n=PU_{1,4}{}^n=0$.

For the downstream pressure boundary condition we have the change in pressure prescribed at the downstream end of the pipe, i.e., $P_{dn}=P_{dn}(t)$, therefore $\Delta P_{dn}=P_{dn}((n+1)\Delta t)-P_{dn}(n\Delta t)$ and $PD_{N+1,1}{}^n\Delta_t P_{N+1}{}^{n+1/2}+PD_{N+1,2}{}^n\Delta_t T_{N+1}{}^{n+1/2}+PD_{N+1,3}{}^n\Delta_t v_{N+1}{}^{n+1/2}+PD_{N+1,4}{}^n\Delta_t A_{N+1}{}^{n+1/2}=\Delta P_{dn}$ where
$PD_{N+1,1}{}^n=1$, and
$PD_{N+1,2}{}^n=PD_{N+1,2}{}^n=PD_{N+1,2}{}^n=0$ For an upstream temperature boundary condition (i.e., when the pipe inflow is at the left hand end of the pipe), we have the change in temperature prescribed at the upstream end of the pipe, i.e. $T_{up}=T_{up}(t)$ therefore $\Delta T_{up}=T_{up}((n+1)\Delta t)-T_{up}(n\Delta t)$ and $TU_{1,1}{}^n\Delta_t P_1{}^{n+1/2}+TU_{1,2}{}^n\Delta_t T_1{}^{n+1/2}+TU_{1,3}{}^n\Delta_t v_1{}^{n+1/2}+TU_{1,4}{}^n\Delta_t A_1{}^{n+1/2}=\Delta T_{up}$ where
$TU_{1,1}{}^n=TU_{1,3}{}^n=TU_{1,4}{}^n=0$ and
$TU_{0,2}{}^n=1$ For a downstream temperature boundary condition (i.e., when the pipe inflow is at the right hand end of the pipe), we have the change in temperature prescribed at the downstream end of the pipe. i.e., $T_{dn}=T_{dn}(t)$ therefore $\Delta T_{dn}=T_{dn}((n+1)\Delta t)-T_{dn}(n\Delta t)$ and $TD_{N+1,1}{}^n\Delta_t P_{N+1}{}^{n+1/2}+TD_{N+1,2}{}^n\Delta_t T_{N+1}{}^{n+1/2}+TD_{N+1,3}{}^n\Delta_t v_{N+1}{}^{n+1/2}+TD_{N+1,4}{}^n\Delta_t A_{N+1}{}^{n+1/2}=\Delta T_{up}$ where
$TD_{N+1,1}{}^n=TD_{N+1,3}{}^n=TD_{N+1,4}{}^n=0$ and
$TD_{N+1,2}{}^n=1$ The area boundary condition uses the relationship between area and pressure and temperature, $A=A(P,T)$, and therefore the area boundary condition should be applied at whichever boundary has both a pressure boundary condition and a temperature boundary condition. Typically this requirement will be satisfied at the upstream boundary, in which case we can write $A_{up}=A_{up}(P_{up}(t),T_{up}(t),)$ therefore $\Delta A_{up}=A_{up}((n+1)\Delta t)-A_{up}(n\Delta t)$ and $AU_{0,1}{}^n\Delta_t P_0{}^{n+1/2}+AU_{0,2}{}^n\Delta_t T_0{}^{n+1/2}+AU_{0,3}{}^n\Delta_t v_0{}^{n+1/2}+AU_{0,4}{}^n\Delta_t A_0{}^{n+1/2}=\Delta A_{up}$ where
$AU_{1,1}{}^n=AU_{1,2}{}^n=AU_{1,3}{}^n=0$ and
$AU_{1,4}{}^n=1$ Writing the computational cell equations for each cell and including the boundary conditions yields a system of linear equations which can be written in block tri-diagonal form $Ax=y$ where A is the coefficient matrix, Y is the vector of equation right hand sides and x is the solution vector providing the update of the primitive variables from one time step to the next. This matrix equation can be solved by, for example, a banded diagonal matrix solver.

Each cell has a flow condition, defined as a flow mode, which may be tight, slack or minimum area. The flow mode of each cell is used to select the form of the fourth equation (tight flow area equation, slack flow area equation or minimum area equation) to be used. A cell's flow mode may change during a time step and so the flow mode is re-evaluated after the matrix has been inverted and the new solution known. If the flow mode in a computational cell would change due to the conditions in the new solution, then the matrix is reformed with the new appropriate fourth equation in place and the solution is recalculated. Again the flow mode is re-evaluated and, if unchanged after the change in the fourth equation, is deemed to be stable. The time step is complete when all cells have stable flow modes as described below.

Tight flow mode means that the pressure within the cell is above the vapor pressure of the product and, as a result, there can be no vapor phase present in the cell. In tight flow mode, a cell is filled the liquid phase of the product, and the fourth equation that is used to complete the equation set is the implicit form of the standard pipe expansion equation, or $A(t)=A(P,T)$, applied at the knot on the downslope side of the cell:

$$A = A_0\left(1 + \frac{1}{A_0}\frac{\partial A}{\partial P}(P - P_0) + \frac{1}{A_0}\frac{\partial A}{\partial T}(T - T_0)\right).$$

Slack flow mode means that the pressure within the cell is maintained at the vapor pressure of the product by reducing the flow area for the liquid phase to accommodate the vapor phase. In slack flow mode, a cell is partially filled with the liquid phase of the product and, therefore, is also partially filled with the vapor phase of the product. The fluid cross-sectional area is not directly constrained by the slack flow area equation, but because it participates in the three conservation equations, it becomes whatever value is required in order to meet the pressure requirement.

Minimum area flow mode means that the pressure is allowed to be lower than the vapor pressure of the product, but with a small, fixed liquid phase cross-sectional flow area. The use of this mode is non-physical and only used to maintain stability of the method by ensuring a positive, non-zero flowing area. In minimum area flow mode, the cell is almost completely devoid of liquid phase, and the knot on the downslope side of the cell has the smallest permitted liquid cross-section. The fourth equation sets the liquid phase flow area of the knot on the downslope side of the cell to minimum area, $A(t)=A_{min}$. The stability of the matrix is not strongly affected by the exact fraction that defines $A_{min}$. Embodiments of the method of the present invention have used 1% and 2% with success. However, $A_{min}$ should not be so small that the assumption that the mass of the vapor phase is much less than the mass of the liquid phase is compromised. With vapor phase density being about $1/1000^{th}$ of liquid phase density, 1% of the pipe area is about as small a fraction for $A_{min}$ as is recommended but, under certain circumstances, embodiments of the present invention can provide accurate results with smaller fractions.

Figure 3:
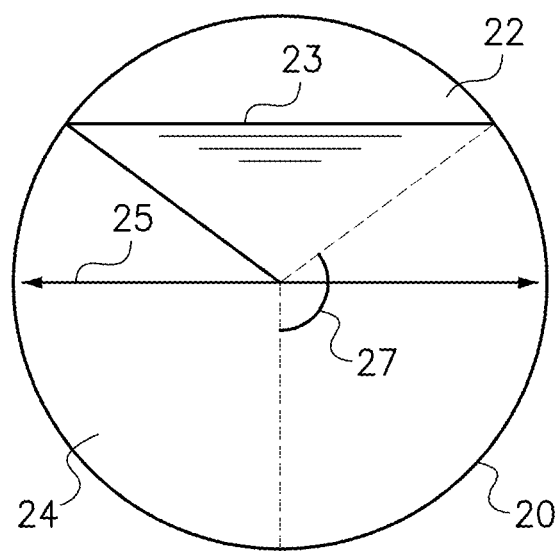
FIG. 3 is a cross-section view of the portion of a pipeline of FIG. 2 in the slack flow region.

The method may be initiated by, for example, setting all cells to the tight flow mode which, in accordance with the steps described herein, will cause the fourth equation for each cell to be the equation for the liquid phase flow area associated with a cell in tight flow mode (i.e., see discussion of FIG. 3 above). The solution obtained with the first iteration is likely to calculate pressures that are, for example, for cells within the modeled segment and at high elevations, below the vapor pressure of the product. As discussed in connection with FIGS. 8 and 9 below, the flow modes of these cells will be re-set to slack flow mode, the area equation to be used for those cells will be will be changed and the system of equations will then be re-solved using the area equations associated with the re-set flow modes for those cells, as is explained in more detail as follows.

After the system of computational cell equations are solved, it is important to assess each computational cell to determine if the flow mode of the cell has changed. If a cell is in tight mode, then it remains tight if the pressure at the upslope knot is higher than the vapor pressure of the product or if the velocity at the downslope knot is into the cell (because a cell cannot possibly be slack if liquid is flowing upslope). If, however, the flow mode of a cell is tight but the pressure at the upslope knot is not higher than the vapor pressure and the velocity at the downslope knot is not, directionally speaking, into the cell, then the flow mode of the cell becomes slack.

If the flow mode of a computational cell is slack, then if the downslope area is less than minimum area, the flow mode of the cell becomes minimum area, and if the downslope area is greater than pipe area, the flow mode of the cell becomes tight. Otherwise, if the downslope area is not less than the minimum area, but the downslope area is not greater than the pipe area, then the flow mode of the cell remains slack.

If the flow mode of a computational cell is minimum area then if the downslope area is greater than minimum area the flow mode of the cell becomes slack, otherwise the computation cell flow mode remains in minimum area. This sub-method of assessing the flow mode of a computational cell is used in combination with the sub-method of determining a solution for the 4(N+1) equations described above to accurately determine and then to continually reassess the state of each computational cell in the model segment.

FIG. 7a is an example of the left hand side matrix "A" 96 (as described above in paragraph [0071]) which is written using the computation cell equations for determining the hydraulic state of the product within the cells of a modelled segment as described above in paragraphs 0062 through 0065 and supplemented by the boundary conditions described in paragraph 0070. The inversion of this matrix will, after multiplication by the right-hand side vector "y" 97 of FIG. 7b (as described in paragraph 0071), produce the required primitive variable change state vector "x" 98 of FIG. 7b (as described above in paragraph 0071). It should be noted that the matrix is square since the number of equations (rows) must equal the number of unknown variables (columns).

Figure 8:
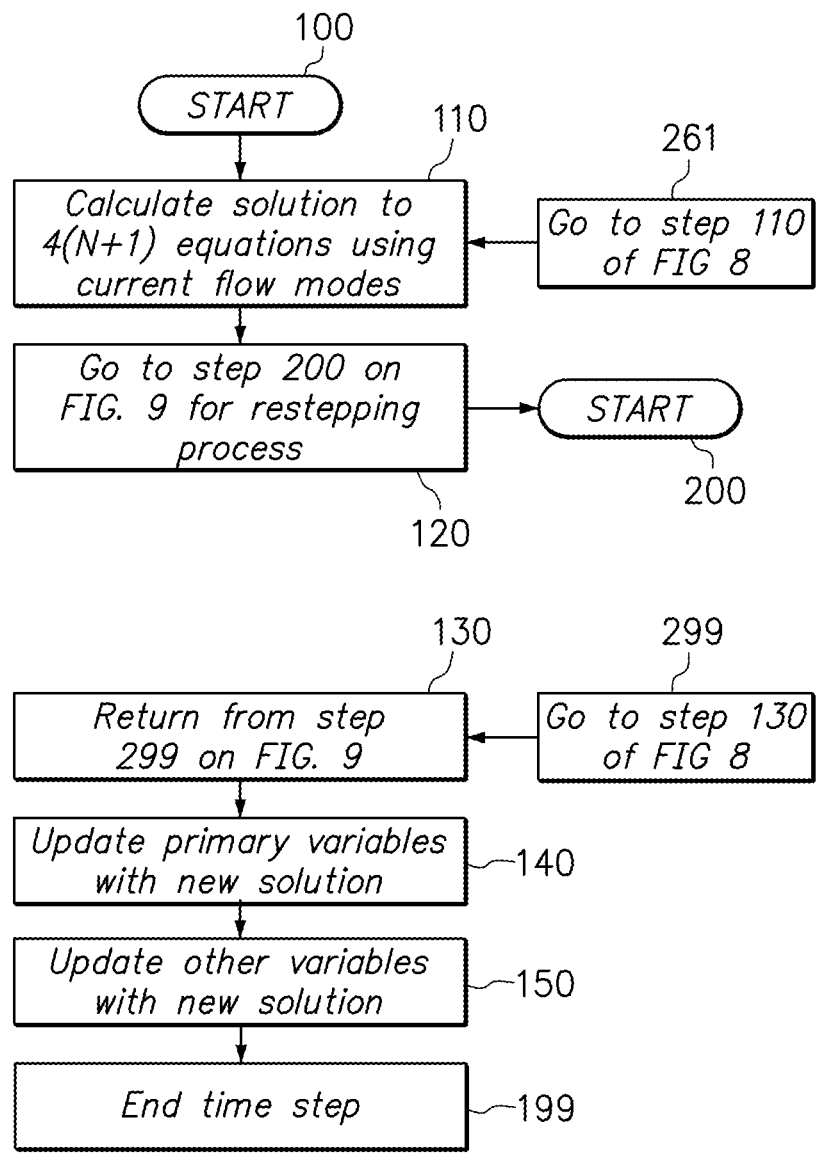
Figure 9:
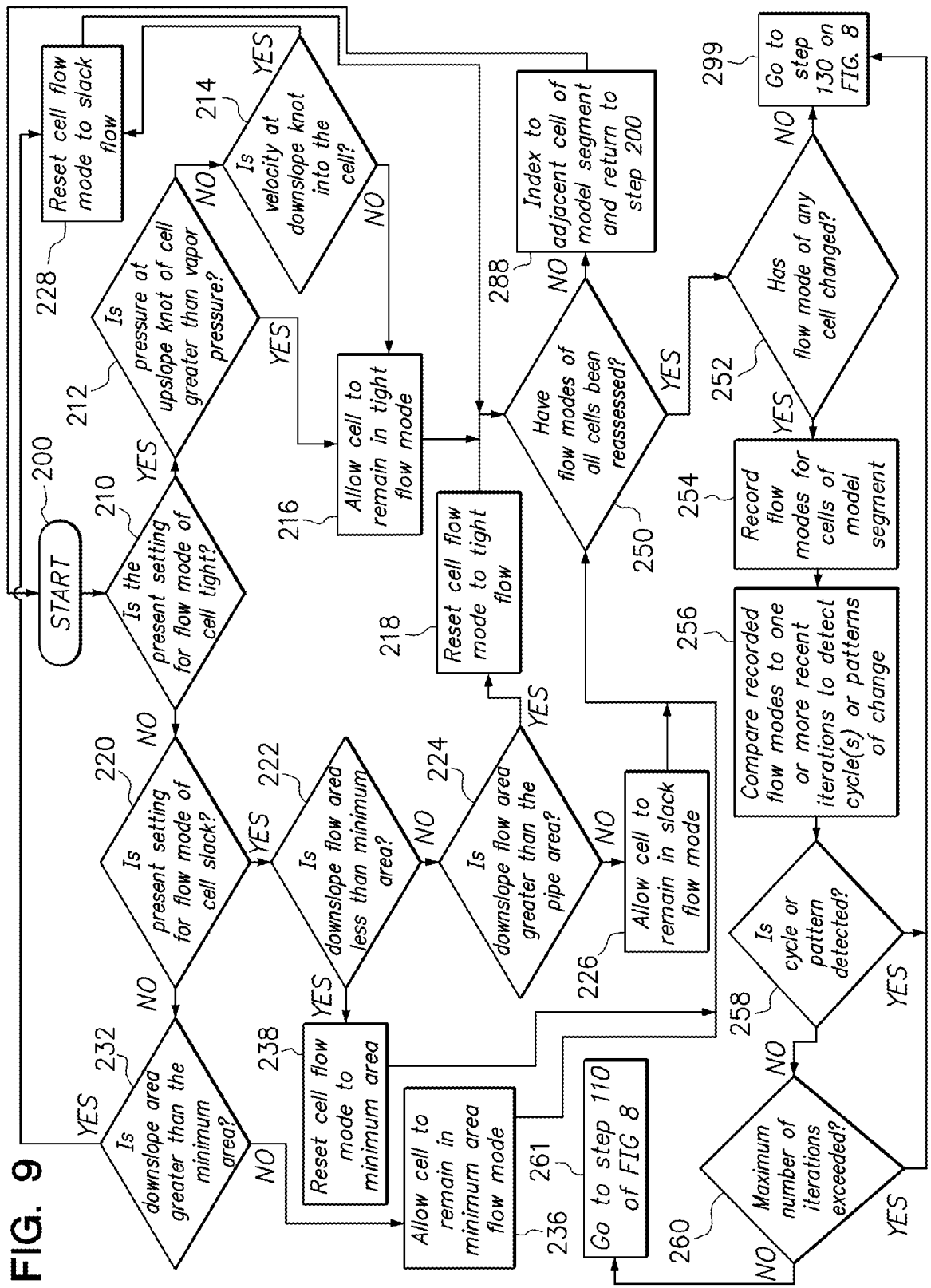
FIG. 9 is a high level flow chart for reassessing the cell flow modes, for determining the stability or instability of the flow mode in each cell, and for maintaining or resetting the flow mode for each cell.

FIG. 8 is a flow chart illustrating the steps of one embodiment of the method to model a modeled segment of a pipeline. After the beginning of the time step at step 100, the solution to the simultaneous 4(N+1) equations described above is calculated in step 110 using, for each computational cell of the modeled segment, the fourth equation corresponding to the flow mode recorded during the previous time step. In step 120, the re-stepping process illustrated in FIG. 9 is performed to determine if conditions warrant changing any flow modes of the computational cells in the model segment. In the re-stepping process, it will be determined that either no computational cell has changed flow mode or that one or more computational cells have changed flow mode.

If it is determined in step 252 of the re-stepping process that no computational cell has changed flow mode then, in step 130, the current set of flow modes for the modeled segment is deemed stable and the solution obtained in step 110 is used to update primitive variables with the new solution in step 140. Finally, other variables are updated with the new solution in step 150 and the time step ends in step 199.

If it is determined in the re-stepping process that at least one computation cell has changed flow mode then the flow modes are deemed to be unstable. The new flow modes will be recorded and the solution to the simultaneous 4(N+1) equations described above will be re-calculated in step 110 using the newly assessed and recorded flow modes. In this step 110, the state at the start of the time step with the fourth equation implied by the revised flow modes are together used to generate a new solution. The flow modes implied by this solution are then evaluated in step 120. It will be understood that the embodiment of the method illustrated by FIGS. 8 and 9 combined could easily be illustrated using a single flow chart, and that the use of these two flow charts in combination is for purposes of simplifying the phases or portions of the method.

As shown in FIGS. 8 and 9, the sub-method of assessing the flow modes of computational cells in the model segment begins at step 200. In step 210 (see FIG. 9), the method determines whether the present setting for the flow mode of the cell of interest is tight and, if it is, the pressure at the upslope knot of the cell is compared to the vapor pressure. If the pressure at the upslope knot is greater than the vapor pressure then, in step 216, the cell is allowed to remain in tight flow mode. If the pressure at the upslope knot is less than or equal to the vapor pressure then, in step 214, the velocity at the downslope knot is evaluated to determine whether the velocity is into the cell. If the velocity at the downslope knot is into the cell then, in step 216, the cell is allowed to remain in tight flow mode. If the velocity is zero or out of the cell then, in step 228, the cell is reset to slack flow mode.

If, in step 210, it is determined that the present setting of the flow mode is not tight then, in step 220, the method determines whether the present setting for the flow mode of the cell is slack and, if it is, the flow area at the downslope knot of the cell is evaluated to determine if the flow area is less than the minimum area. If the flow area at the downslope knot of the cell is less than the minimum flow area then, in step 238, the flow mode of the cell is reset to minimum area. If the flow area at the downslope knot of the cell is greater than or equal to the minimum area then, in step 224, the flow area at the downslope knot is evaluated to determine if the flow area is greater than the pipe area and, if it is, the flow mode of the cell is reset to tight flow mode. If the flow area of the downslope knot is less than or equal to the pipe area then, in step 226, the flow mode of the cell is allowed to remain slack.

If, in step 220, the present setting of the flow mode of the cell is determined not to be in slack flow then the cell must necessarily be in minimum area flow mode since both tight flow mode and slack flow mode have been eliminated as possibilities in steps 210 and 220. Then, in step 232, the flow area at the downslope knot of the cell is compared to the minimum flow area to determine of the flow area is greater than the minimum flow area and, if it is, then, in step 228, the flow mode of the cell is reset to slack flow. If the flow area at the downslope knot of the cell is less than or equal to the minimum flow area then, in step 236, the flow mode of the cell is allowed to remain in minimum flow.

If the flow mode of the cell has been evaluated and allowed to remain in tight flow in step 216, or if the flow mode of the cell has been allowed to remain in slack flow in step 226, or if the flow mode of the cell has been allowed to remain in minimum area flow in step 236, or if the flow mode of the cell has been reset to tight flow in step 218, or if the flow mode of the cell has been reset to slack flow in step 228, or if the flow mode of the cell has been reset to minimum area in step 238, the cells which have been reassessed is checked in step 250 and, if all cells in the modeled segment have been reassessed then, in step 252, the new flow modes of the cells are each compared to the formerly recorded flow modes of the cells to determine whether the flow modes of any cell in the modeled segment has changed. If any cell has changed flow mode then, in step 254, the new flow modes are recorded and then, in step 256, the recorded flow modes are compared to one or more recent iterations to detect a cycle or pattern of changes. If, for the flow mode changes that are detected, a cycle or pattern of changes is evident from comparison of the recorded data then, in step 258 and in step 299, the re-stepping process is terminated and the time step resumes at step 130 on FIG. 8. If, however, the flow mode changes are not due to cycles or patterns of changes then, in step 260, the number of iterations is compared to a maximum number allowable and, if the maximum number of iterations has been reached then, in step 260 and step 299, the re-stepping process is terminated and the time step resumes at step 130 on FIG. 8. If the maximum number of iterations has not reached the maximum then, in step 261, a new iteration begins as the solution to the 4(N+1) equations is calculated using the new flow modes recorded in step 254.

It should be understood that the maximum number of iterations is an iteration filter than can be set at the onset of a simulation as part of a programming or initialization step. It should be understood that the detection of patterns or cycles of changes is also an iteration filter that can also be set at the onset of a simulation as part of a programming or initialization step. For example, but not by way of limitation, it may be detected in step 252 that the flow modes of three adjacent cells have changed, all three cells being on a gently descending slope portion of the modeled segment. It may further be detected, in subsequent step 256 that all three of these adjacent cells have a pattern, over the most recent iterations, of switching or alternating between slack and tight flow. In this case, it may not be useful to continue with further iterations which will be caused by continuing alternations between slack flow mode and tight flow mode on these same adjacent cells and, in order to avoid an unnecessary waste of processor capacity and to further the simulation of flow in the modeled segment, the re-stepping process may be terminated.

The loop of re-evaluating flow modes and recalculating the solution based on these new flow modes continues until the set of flow modes is stable, at which point the hydraulic variables are updated in steps 150 and 160 with the solution and the time step is effectively complete. It will be understood that, in an alternate embodiment of the method, the re-evaluation step may continue until a predetermined number of loop iterations has been completed.

This cycle of re-evaluating flow modes and recalculating the solution within a time step using the revised set of flow modes (re-stepping) is particularly effective when multiple computational cells change flow mode within a single time step, for example, when slack flow develops on gently descending portion of the modeled segment of the pipeline. Conventional modeling methods are not adapted for these situations and will often produce numerically unstable and non-physical solutions (e.g., will calculate negative pressures).

During transient conditions within the pipeline, slack line regions expand, contract, initiate and collapse. This can produce numeric instability in the solution of the matrix equations, particularly when conditions are changing rapidly, as shut-in conditions are developing or resolving, and when slack line conditions begin on shallow slopes. Under these conditions, many cells, particularly neighboring cells, experience mode changes during a single time step. To counter this effect, the re-stepping, introduced as described above, is employed so that at the end of the time step a set of flow modes for the computational cells is stable.

Re-stepping provides numerical stability when transitioning from one time step to the next. The steps used to write the area equation provide improved accuracy and stability for bidirectional flow and for shut-in conditions.

Embodiments of the method include steps to ensure stability in the sequential determination of cell modes and conditions. The area equation for each cell varies depending on the determined cell flow mode. The direction of application of the area equation depends on the slope of the cell. If the elevation of the knot on the right side of the cell is greater than the elevation of the knot on the left side of the cell, the right side knot is the upslope knot and the left knot is the downslope knot. Otherwise, the knot on the left side is the upslope knot and the knot on the right side is the downslope knot. The flow mode of a cell, once determined, is stored with variables for the knot at the right side of the cell for the cells that are included in the model segment in left to right order, and is stored with variables for the knot at the left side of the cell for cells that are included in the model segment in right to left order. This practice preserves the cell state under all dynamic configuration changes which occur, for example, when a valve within the model segment is either opened or closed or when capacity to obtain and use data provided by a sensor within the model segment is either lost or recovered.

Since the area equation involves only variables at a single knot, it can be written in the equation slot of the cell for which the knot is the right side or it can be written in the equation slot of the cell for which the knot is the left side.

An upslope cell writes its area equation into the equation slot of the preceding cell. A downslope cell writes its area equation into its own equation slot. The knot at a local minimum elevation has an equation written into an equation slot for it once by the downslope cell on the left, and then overwritten into the same equation slot by the upslope cell on the right. By contrast, the knot at a local maximum elevation (an elevation peak) does not have an equation written for it by either cell, except as described below.

Embodiments of the method of the present invention anticipate and prevent inconsistencies that could make the matrix singular or ill-conditioned, and hence prevent solution of the matrix equations. There are two specific complications that are anticipated. One complication involves local maximums. When equations of state are written by a downslope cell, a check is performed to determine whether the downslope cell is adjacent to a local maximum (i.e., a peak elevation) and, thus, whether an area equation has been written at the peak. If no area equation has been written for the peak, the downslope cell writes an appropriate area equation according to the following rule: if both cells adjacent to the peak are tight, the area at the peak is also tight, and $A_{peak}(t)=A(\text{pressure, temperature})$; if both cells adjacent to the peak are minimum area, the equation at the peak is a minimum area equation, and $A_{peak}(t)=A_{min}$; otherwise, at least one side of the peak is slack and the area at the peak is set equal to the average of the area at the knot on the immediate left side of the peak and the area at the knot on the immediate right side of the peak.

Another complication involves a determination that the flow modes of cells on both sides of a peak elevation are slack. When the flow modes of cells on both sides of the peak are slack, both cells will attempt to set the pressure at the peak, $P_{peak}$, equal to the vapor pressure, $P_{vapor}$, in different equation slots. This will make the matrix singular due to rank deficiency. One of these equations must be replaced in order for the model to function. An approach used by one embodiment of the method is to set the flow across the peak to zero. This is physically realistic because you can only achieve slack conditions on both sides of a peak when drain-down occurs on both sides of the peak. Since the peak cannot sustain outflow in both directions for very long, flow approaches and becomes identically zero. The area equation of the downslope cell is overwritten by setting the velocity to zero, or $v_{peak}=0$.

Furthermore, when drain-down at a peak causes neighboring cells to approach and reach the minimum area limit, additional care must be taken to maintain the stability and physical reality of the model. When the flow mode of the cell on one side of the peak is the minimum area and the flow mode of the cell on the other side of the peak is either slack or minimum area, and if the average of the pressure at the peak knot and at the knot to the right of the peak is less than the average of the vapor pressure at those two knots, then the momentum equation for the downslope cell is overwritten by setting the velocity to zero, or $v_{peak}=0$. This is known as the flow stoppage condition.

In addition, when at least one peak in a model segment goes slack, it is necessary to relax the flow stoppage condition at other local elevation maxima in the model segment. Without relaxing the flow stoppage condition, the embodiment of the method can produce non-physical flows across other local maxima. Once any local maximum in the model segment has satisfied the flow stoppage condition, an additional check is performed at local maxima to determine whether the average of the pressure at the peak knot and at the knot to the right of the peak is less than the average of the vapor pressure at those two knots. If this less strict flow stoppage condition is satisfied, then the momentum equation for the downslope cell is overwritten by setting the velocity to zero, or $v_{peak}=0$. This is the same as treating the peak as if the flow mode on a first side is minimum area and the flow mode on the second, remaining side is either slack or minimum area, regardless of the actual mode.

If the last cell is upslope, its area equation will be written into the slot of the previous cell, an area equation must be written for the last slot: $A_{N+1}(t)=A(\text{pressure, temperature})$. This combination of rules, together with the boundary conditions, ensures that the matrix that is written is always non-singular and that a complete set of non-redundant fourth equations is written.

The equations of motion are not sensitive to direction. The rules for constructing the matrix given above encompass the solution to reverse flow and reversing flow, shut-in and start-up, drain-down, and other transient flow conditions. Drain-down is captured by the minimum area mode, and shut-in is captured in part by the peak stoppage portion of the method. Attention to the slope direction captures most of the requirements to solve reversing the flow. Mode checking and re-stepping provide the solution to transitions between tight, slack and drain-down.

The minimum area constraint is essentially non-physical because it occurs when the pipe is nearly empty and acts to keep a minimum amount of fluid in the interval even when, in the real world, the fluid would completely drain out of the pipe in which the cell resides. Minimum area occurs during shut-in conditions. The minimum area constraint prevents the equations of motion from breaking down as they would with a cell having no liquid phase therein. In addition, the equations of motion neglect the contribution of the vapor phase to the mass, momentum and energy in cells with both liquid phase and vapor phase. This is because the ratio of density of the liquid phase to the density of the vapor phase is on the order of 1,000 to 1. The approximation achieved by neglecting the contribution of the vapor phase to mass, momentum and energy is valid down to a liquid phase of just a few percent of the total pipe cross-section. When minimum area mode occurs, pipe pressure is allowed to drop below the vapor pressure of the product and will generally produce the non-physical result of pressure below zero.

As will be appreciated by those skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as C#, Java, Smalltalk, C++ or the like and conventional procedural programming languages, such as the "C" programming language, the FORTRAN programming language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of modeling a flow of a volatile product through a pipeline comprising:
 creating a system of equations representing the laws of conservation of mass, energy and momentum of the product in a plurality of discrete cells defined within a modeled segment of the pipeline;
 providing a plurality of sensors at known cells of the modeled segment and using each provided sensor to detect a condition of the product in a known cell with the sensor;
 beginning, via a processor, a simulation of the modeled segment comprising:
  setting a simulation clock time to zero;
  providing to the processor data relating to physical characteristics of the pipeline;
  providing to the processor data relating to physical positions of the defined cells of the modeled segment;
  providing to the processor data relating to properties of the product comprising a vapor pressure of the product, a viscosity of a liquid phase of the product, and a density of the liquid phase of the product; and
  providing to the processor a product liquid phase minimum area threshold;
 performing a first time step of the simulation comprising:
  incrementing the simulation clock time by the first time step;
  providing to the processor a first set of signals corresponding to conditions of the product detected by the sensors at the known cells;
  performing an iteration for each defined cell of the modeled segment at the simulation clock time, comprising:
   solving, using the processor, the system of equations representing a state of the product in the defined cell using the data relating the physical characteristics of the pipeline, the data relating the position of the defined cell, the data relating the properties of the product and the first set of signals corresponding to conditions of the product in the known cells with the sensors;
determining the current flow mode of the product in the defined cell to be one of minimum area flow mode, slack flow mode and tight flow mode, wherein minimum area flow mode indicates that the defined cell is empty of a liquid phase of the product, tight flow mode indicates that the defined cell is completely filled with the liquid phase of the product, and slack flow mode indicates that the defined cell is partially filled with the liquid phase of the product with an upwardly disposed portion of the defined cell containing a vaporous phase of the product with the liquid phase moving there below in open channel flow; and
terminating the iteration for each defined cell; and
terminating the first time step of the simulation;
performing successive simulation time steps iterations comprising:
incrementing the simulation clock time by the time step;
setting repeat simulation time steps to false;
providing to the processor a second set of signals corresponding to conditions of the product detected by the sensors at the known cells;
performing an iteration for each defined cell of the modeled segment at the simulation clock time, comprising:
setting the defined cell flow mode changed to false;
setting a previous flow mode of the defined cell to the current flow mode of the defined cell;
solving, using the processor, the system of equations representing the state of the product in the defined cell using the data relating the physical characteristics of the pipeline, the data relating the physical position of the defined cell, the data relating the properties of the product and the second set of signals corresponding to conditions of the product in the known cells with the sensors;
if the defined cell's previous flow mode is tight:
determining if the pressure at an upslope knot of the defined cell is less than or equal to the vapor pressure of the product and that a velocity of the product at a downslope knot of the defined cell is directed out of the defined cell; and
if so, setting the current flow mode of the product in the defined cell to slack;
if the defined cell's previous flow mode is minimum area:
determining if an area of flow of the liquid phase of the product at the downslope knot of the defined cell is greater than the product liquid phase minimum area threshold; and
if so, setting the current flow mode of the product in the defined cell to slack;
if the defined cell's previous flow mode is slack:
determining if the area of flow of the liquid phase of the product at the downslope knot of the defined cell is less than the product liquid phase minimum area threshold; and
if so, setting the current flow mode of the product in the defined cell to minimum area;
if the defined cell's previous flow mode is slack:
determining, if the determined area of flow of the liquid phase of the product at the downslope knot of the defined cell is greater than the cross-sectional area of the pipe; and
if so, setting the current flow mode of the product in the defined cell to tight;
if the defined cell's current flow mode is not equal to the previous flow mode:
setting the defined cell's flow mode changed to true; and
setting repeat simulation time steps to true; and
terminating performing the iteration for each defined cell;
if repeat simulation time steps is set to true, going to performing successive simulation time steps iterations and repeating the next simulation time step iteration;
terminating the performing successive simulation time steps iterations;
updating a set of primitive variables with values from the last simulation time step, the primitive variables including one or more of pressure, temperature, velocity, and liquid phase cross-sectional area of the product; and
ending the simulation of the modeled segment in the processor.

2. The method of claim 1 further comprising:
providing to the processor a maximum number of successive simulation time steps iterations to be performed where the flow mode of at least one defined cell changes from a previous iteration to a subsequent iteration;
determining a number of successive simulation time steps iterations performed in which the system of equations is solved;
comparing the number of successive simulation time steps iterations performed to the maximum number of successive simulation time steps iterations to be performed; and
terminating the iteration for each defined cell in response to determining that the number of successive simulation time steps iterations performed in which the system of equations is solved equals the maximum number of successive simulation time steps iterations provided to the processor.

3. The method of claim 1 further comprising:
in response to a determination that at least one defined cell's flow mode changed is set to true:
determining whether changes in the current flow mode of any defined cell whose flow mode changed is set to true, exhibits a recurrent pattern; and
excepting from the step of performing the iteration for each defined cell, each of the defined cells of the modeled segment in which the recurrent pattern of flow mode change is detected;
wherein the exception of the defined cells in which the recurrent pattern of flow mode change is detected enables the method to proceed to the updating of the set of primitive variables and to escape redundant iterations caused by an instability of one or more defined cells.

4. The method of claim 3 further comprising:
providing to the processor the recurrent patterns of flow mode changes that enable a defined cell to be excepted.

5. The method of claim 1 wherein the step of providing a plurality of sensors at known cells of the modeled segment and using each provided sensor to detect a condition of the product in a known cell with the sensor comprises:
  providing a first sensor at a first known cell of the modeled segment;
  providing a second sensor at a last known cell of the modeled segment;
  using the first sensor to detect a boundary condition of the product in the first known cell of the modeled segment; and
  using the second sensor to detect a second boundary condition of the product in the last known cell of the modeled segment.

6. The method of claim 5 wherein the boundary condition detected by the first sensor is at least one of velocity and pressure of the product within the first known cell.

7. The method of claim 6 wherein the boundary condition detected by the second sensor is at least one of velocity and pressure of the product within the last known cell.

8. The method of claim 5 wherein a third sensor is provided to detect a condition of the product within at least one of the first and last known cells of the modeled segment.

9. The method of claim 8 wherein the third sensor is a temperature sensor.

10. The method of claim 1 wherein the product liquid phase minimum area threshold is two percent of a cross-sectional flow area within the modeled segment of the pipeline.

11. The method of claim 1 wherein the product liquid phase minimum area threshold is one percent of a cross-sectional flow area within the modeled segment of the pipeline.

12. The method of claim 1 wherein the product is oil.

13. The method of claim 1 wherein the data relating the physical characteristics of the pipeline comprises data relating an inner diameter of the pipeline, a roughness of the pipeline, a wall thickness and pressure/thermal expansion coefficients of the pipe product and thermal characteristics including specific heat capacity, density and thermal conductivity.

14. The method of claim 1 wherein the data relating the physical positions of the cells of the modeled segment comprises data relating a distance of the cells along a length of the pipeline and elevation of the cells above a known datum.

15. A method of modeling a flow of a volatile product through a pipeline comprising:
  defining a model segment of the pipeline comprising a plurality of discrete cells;
  creating a system of equations representing the conservation of mass, energy and momentum of the product in the plurality of discrete cells defined within the modeled segment;
  providing a first sensor at a first known cell at a first end of the modeled segment to detect a pressure of the product within the first known cell;
  providing a second sensor at a last known cell at a second end of the modeled segment to detect a pressure of the product within the last known cell;
  providing a third sensor at a third known cell of the modeled segment to detect a condition of the product within the third known cell;
  beginning, via a processor, a simulation of the modeled segment comprising:
    setting a simulation clock time to zero;
    providing to the processor data relating to physical characteristics of the pipeline;
    providing to the processor data relating to physical positions of the defined cells of the modeled segment;
    providing to the processor data relating to properties of the product comprising a vapor pressure of the product, a viscosity of a liquid phase of the product, and a density of the liquid phase of the product; and
    providing to the processor a product liquid phase minimum area threshold;
  performing a first time step of the simulation comprising:
    incrementing the simulation clock time by the first time step;
    providing to the processor a first signal corresponding to the pressure of the product in the first known cell;
    providing to the processor a second signal corresponding to the pressure of the product in the last known cell;
    providing to the processor a third signal corresponding to the condition of the product within the third known cell;
    performing an iteration for each defined cell of the modeled segment at the simulation clock time, comprising:
      solving, using the processor, the system of equations representing a state of the product in the defined cell using the data relating the physical characteristics of the pipeline, the data relating the position of the defined cell, the data relating the properties of the product and the first, second and third signals corresponding to the pressures and the condition of the product in the known cells with the sensors;
      determining the current flow mode of the product in the defined cell to be one of minimum area flow mode, slack flow mode and tight flow mode, wherein minimum area flow mode indicates that the defined cell is empty of a liquid phase of the product, tight flow mode indicates that the defined cell is completely filled with the liquid phase of the product, and slack flow mode indicates that the defined cell is partially filled with the liquid phase of the product, with an upwardly disposed portion of the defined cell containing a vaporous phase of the product with the liquid phase moving there below in open channel flow; and
    terminating the iteration for each defined cell; and
  terminating the first time step of the simulation;
  performing successive simulation time steps iterations comprising:
    incrementing the simulation clock time by the time step;
    setting repeat simulation time steps to false;
    providing to the processor a fourth signal corresponding to the pressure of the product in the first known cell, a fifth signal corresponding to the pressure of the product in the last known cell and a sixth signal corresponding to the condition of the product in the third known cell, the fourth, fifth and sixth signals relating to pressures and the condition at the simulation clock time;
    performing an iteration for each defined cell of the modeled segment at the simulation clock time, comprising:
      setting the defined cell flow mode changed to false;
      setting a previous flow mode of the defined cell to the current flow mode of the defined cell;

solving, using the processor, the system of equations representing the state of the product in the defined cell using the data relating the physical characteristics of the pipeline, the data relating the physical position of the defined cell, the data relating the properties of the product and the fourth, fifth and sixth signals corresponding to pressures and the condition of the product in the known cells with the sensors;

if the defined cell's previous flow mode is tight:
  determining if the pressure at an upslope knot of the defined cell is less than or equal to the vapor pressure of the product and that a velocity of the product at a downslope knot of the defined cell is directed out of the defined cell; and
  if so, setting the current flow mode of the product in the defined cell to slack;

if the defined cell's previous flow mode is minimum area:
  determining if an area of flow of the liquid phase of the product at the downslope knot of the defined cell is greater than the product liquid phase minimum area threshold; and
  if so, setting the current flow mode of the product in the defined cell to slack;

if the defined cell's previous flow mode is slack:
  determining if the area of flow of the liquid phase of the product at the downslope knot of the defined cell is less than the product liquid phase minimum area threshold; and
  if so, setting the current flow mode of the product in the defined cell to minimum area;

if the defined cell's previous flow mode is slack:
  determining, if the determined area of flow of the liquid phase of the product at the downslope knot of the defined cell is greater than the cross-sectional area of the pipe; and
  if so, setting the current flow mode of the product in the defined cell to tight;

if the defined cell's current flow mode is not equal to the previous flow mode:
  setting the defined cell's flow mode changed to true;
  setting repeat simulation time steps to true; and terminating performing the iteration for each defined cell;

if repeat simulation time steps is set to true, going to performing successive simulation time steps iterations and repeating the next simulation time step iteration;

terminating the performing successive simulation time steps iterations;

updating a set of primitive variables with values from the last simulation time step, the primitive variables including one or more of pressure, temperature, velocity, and liquid phase cross-sectional area of the product; and ending the simulation of the modeled segment in the processor.

16. The method of claim 15 wherein the third sensor is a temperature sensor.

17. The method of claim 16 wherein the third sensor is disposed in a defined adjacent to the first known cell of the modeled segment.

18. The method of claim 15 further comprising, in response to a determination that at least one defined cell's flow mode changed is set to true:

determining whether changes in the current flow mode of any defined cell whose flow mode changed is set to true, exhibits an alternating pattern; and excepting from the step of performing the iteration for each defined cell, each of the defined cells of the modeled segment in which the alternating pattern of flow mode change is detected;

wherein the exception of the defined cells in which the alternating pattern of flow mode change is detected enables the method to proceed to the updating of the set of primitive variables and to escape redundant iterations caused by an instability of one or more defined cells.

19. The method of claim 18 wherein determining whether at least one defined cell's flow mode changed is set to true is repeated until no defined cell of the modeled segment exhibits a flow mode change from the previous flow mode.

20. The method of claim 15, further comprising:

providing to the processor a maximum number of successive simulation time steps iterations to be performed where the flow mode of at least one defined cell changes from a previous iteration to a subsequent iteration;

determining a number of successive simulation time steps iterations performed in which the system of equations is solved;

comparing the number of successive simulation time steps iterations performed to the maximum number of successive simulation time steps iterations to be performed; and terminating the iteration for each defined cell in response to determining that the number of successive simulation time steps iterations performed in which the system of equations is solved equals the maximum number of successive simulation time steps iterations provided to the processor.

* * * * *

UNITED STATES PATENT AND TRADEMARK OFFICE
CERTIFICATE OF CORRECTION

PATENT NO.        : 9,910,940 B2
APPLICATION NO.   : 14/694472
DATED             : March 6, 2018
INVENTOR(S)       : Jonathan Barley et al.

It is certified that error appears in the above-identified patent and that said Letters Patent is hereby corrected as shown below:

In the Specification

At Column 5, Line 40, "shut down" should be -- shutdown --.

At Column 17, Line 38, "modelled" should be -- modeled --.

Signed and Sealed this
Thirtieth Day of July, 2019

Andrei Iancu
*Director of the United States Patent and Trademark Office*